United States Patent
Hama et al.

(10) Patent No.: US 7,162,274 B2
(45) Date of Patent: Jan. 9, 2007

(54) FOLDING COMMUNICATION TERMINAL AND DISPLAY CONTROL METHOD THEREFOR

(75) Inventors: Mitsuji Hama, Higashiosaka (JP); Tadahiro Emoto, Kobe (JP); Kenji Kiyota, Shijonawate (JP)

(73) Assignee: Sanyo Electric Co., Ltd., Osaka (JP)

( * ) Notice: Subject to any disclaimer, the term of this patent is extended or adjusted under 35 U.S.C. 154(b) by 764 days.

(21) Appl. No.: 09/963,079

(22) Filed: Sep. 24, 2001

(65) Prior Publication Data

US 2002/0039914 A1   Apr. 4, 2002

(30) Foreign Application Priority Data

Sep. 29, 2000   (JP) .............................. 2000-301033
Sep. 29, 2000   (JP) .............................. 2000-301034
Sep. 29, 2000   (JP) .............................. 2000-301035

(51) Int. Cl.
*H04B 1/38* (2006.01)
(52) U.S. Cl. ............... 455/566; 455/567; 455/575.1
(58) Field of Classification Search ............... 455/403, 455/550.1, 566, 567, 575.1, 575.3, 90.1–90.3; 379/142.01, 142.16, 142.17, 354, 355.01; 362/24, 31; 345/22
See application file for complete search history.

(56) References Cited

U.S. PATENT DOCUMENTS

| | | | | | |
|---|---|---|---|---|---|
| 4,726,059 | A | * | 2/1988 | Havel | 379/354 |
| 5,602,908 | A | * | 2/1997 | Fan | 379/199 |
| 5,946,636 | A | * | 8/1999 | Uyeno et al. | 455/566 |
| 6,438,392 | B1 | * | 8/2002 | Toba | 455/567 |
| 6,466,292 | B1 | * | 10/2002 | Kim | 349/143 |
| 6,690,955 | B1 | * | 2/2004 | Komiyama | 455/566 |

* cited by examiner

*Primary Examiner*—Melur Ramakrishnaiah

(57) ABSTRACT

The folding communication terminal of the present invention is composed of a display device which is visible to the user when the folding communication terminal is in a folded state, and which is capable of multicolor display. The user knows by glancing at the illumination color, without reading characters displayed on the display device and without straining their eyes, whether a caller's telephone number is notified or not. Furthermore, the display is illuminated in a color which is specified and registered in advance in correspondence with the caller's telephone number. The user is thus able to know at a glance who a call is from. Furthermore, the display device is illuminated in a color distinguishing between whether there is notification information which is yet to be displayed or not. The user can judge whether it is necessary to check notification information with a glance at the illumination color.

12 Claims, 18 Drawing Sheets

Fig.6
(B1)
(B2)
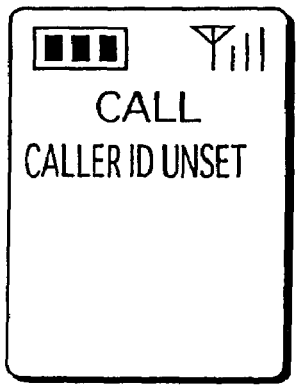
(C1)
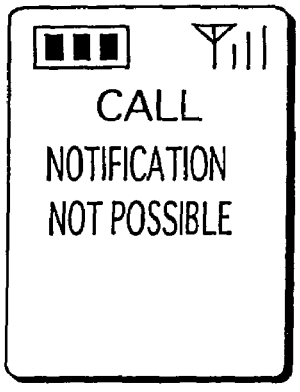
(C2)
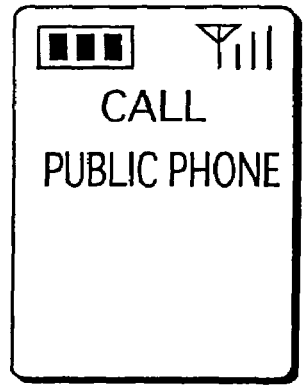
(C3)

| INFORMATION CATEGORY | RECEPTION DATE /TIME | CALLER/SENDER INFORMATION | RESPONSE CATEGORY | SUBJECT | DISPLAY FLAG |
|---|---|---|---|---|---|
| ... | ... | ... | ... | ... | ... |
| C-MAIL | 08/01 10:00 | — | READ | — | 1 |
| E-MAIL | 08/10 10:00 | jiro@aaa.bbb.co.jp | READ | THANK YOU | 1 |
| CALL | 09/01 09:00 | TARO YAMADA | ANSWERED | — | 1 |
| CALL | 09/01 10:00 | 09012345678 | MISSED | — | 0 |
| E-MAIL | 09/01 10:30 | TARO YAMADA | UNREAD | ABOUT THE OTHER DAY | 0 |
| C-MAIL | 09/01 11:00 | — | UNREAD | — | 0 |
| E-MAIL | 09/01 11:30 | jiro@aaa.bbb.co.jp | UNREAD | MEETING | 0 |

(B) CALL 1 10:00

(C) E-MAIL 1 10:30

(D) C-MAIL 1 11:00

(E) E-MAIL 2 11:30

Fig.13
(A)
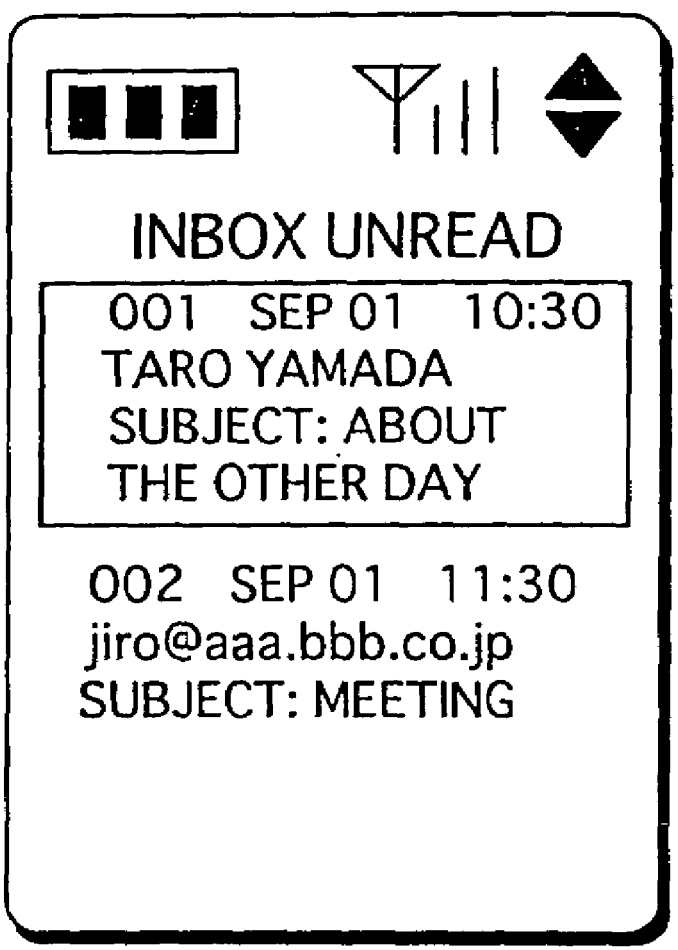
(B) 

Fig.15
(A) 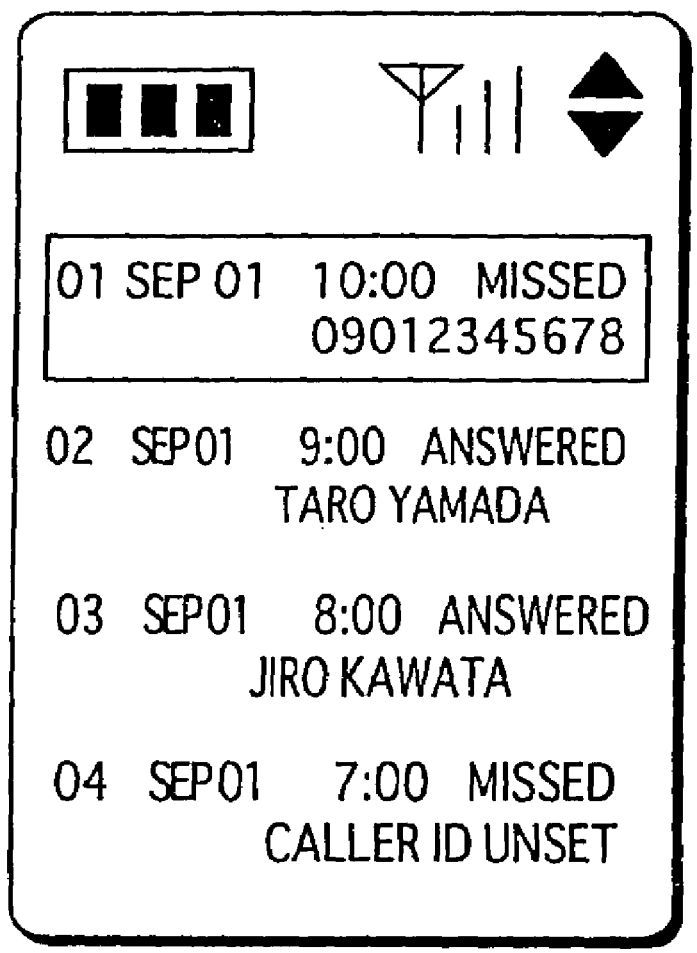
(B) 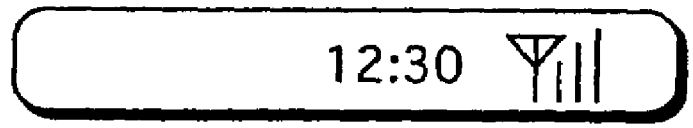

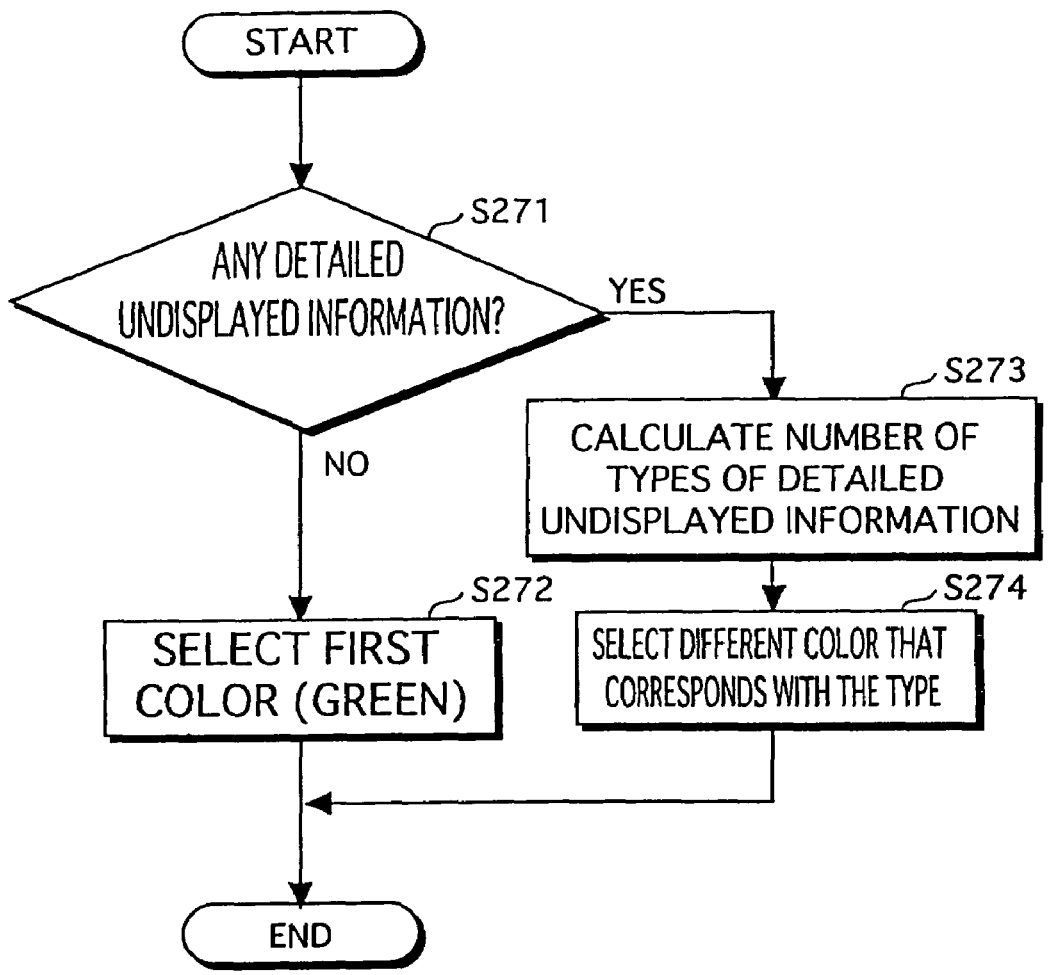

FOLDING COMMUNICATION TERMINAL AND DISPLAY CONTROL METHOD THEREFOR

BACKGROUND OF THE INVENTION (1) Field of the Invention

The present invention relates to a folding communication terminal and a display control method therefor, and in particular to a technique for controlling illumination of a display of the folding communication terminal, that is visible to the user when the folding communication terminal is in a closed state and that is capable of multicolor displaying.

(2) Description of the Related Art

In recent years mobile communication devices which are used in systems such as PHS (Personal Handyphone System), PDC (Personal Digital Cellular telecommunication system), and CDMA (Code Division Multiple Access) have become common because of decreases in their size and weight, improvement in their communication quality, and reduction of prices of the devices themselves and call charges, and are now a must-have for young people. Recently, folding communication terminals which are fashionable and allow for easy operation are extremely popular, with manufacturers competing against each other to sell folding communication terminals.

Japanese Laid-Open Patent Application H11-74953 discloses a technique regarding a conventional folding communication terminal, which is already well-known. In the technique the folding communication terminal is provided with a sub-display that notifies the user of information about incoming-calls and so on, even when the folding communication apparatus is in a folded state, in addition to being provided with a main display. The sub-display is an auxiliary display for displaying a minimum necessary amount of information to the user when the folding communication device is in a closed state. Generally, a sub-display which has a smaller display area and costs less than the main display is used in order to avoid increasing the size and the price of the terminal. Specifically, a color LCD (Liquid Crystal Display) is used for the main display, and a black and white LCD which can display one row of approximately ten characters is used for the sub-display.

The sub-display displays for example (1) stand-by information showing the present time, the electric field strength and so on during stand-by, (2) when an incoming-call is received, a caller's telephone number, or the caller's name which has been stored beforehand in a telephone directory in correspondence with the caller's telephone number, or information showing that the caller's telephone number is not identified, and (3) when there is new detailed information to be displayed on the main screen, the sub-display displays simplified information showing the type and number of pieces of new detailed information.

By reading the aforementioned information displayed on the sub-display, the user can know the time, who a call is from before answering, and whether there is new detailed information to be checked on the main screen, without opening the folding communication terminal.

In particular, when there is a call, the user can identify the caller while the folding communication apparatus is still closed. This saves trouble for the user who might otherwise answer a call from someone with whom they are on bad terms, a salesperson whose caller ID is unset, or a vicious stalker, resulting in unpleasantness for the user, being made to buy an unwanted product, or being entangled in a vicious crime.

In addition, the user is also saved the trouble of regularly having to open the folding communication terminal to check for detailed information because the user knows whether there is new detailed information or not with the folding communication terminal closed.

As described above, operability of folding communication devices is being improved by display of information on the sub-display, but there is a problem in that the display content is extremely difficult to read because of the small size of the sub-display. Thus there is a demand to further improve the visibility of the information displayed while the folding communication terminal is closed.

Note that another method of letting the user know the identity of a caller when the folding communication terminal is closed is to register telephone numbers with ringer melodies in the telephone directory memory in advance. If there is a ringer melody registered in correspondence with a caller's telephone number when there is an incoming-call, the corresponding ringer melody is played, letting the user know who the call is from. For example, if the user registers a ringer melody "I Just Called to Say I Love You" in correspondence only with his/her girl/boyfriend's telephone number, the user knows straight away that a call is from his/her girl/boyfriend when "I Just Called to Say I love You" is played.

However, ringers cause a disturbance at concerts, meetings and so on, meaning that many users set their folding communication terminals to manner mode so that they are notified of calls by a vibration, and many users ordinarily keep their folding communication terminals set to manner mode to avoid the disturbance of unexpected ringing. This means that the method of identifying callers by ringer-melody is not always effective.

SUMMARY OF THE INVENTION

In view of the stated problem, the object of the present invention is to provide a folding communication apparatus and a display method with which a user can judge an outline of notification information at a glance without reading simplified notification such as a caller's telephone number which is displayed on the sub-display device.

(1) A communication terminal of the present invention receives caller information during reception of an incoming-call, and has a detection function for detecting whether a main body of the communication terminal is in a folded state or in an unfolded state, including: a main display device which is visible to a user only when the main body is in the unfolded state, and which is capable of multicolor illumination display; a sub-display device which is visible to the user when the main body is in the folded state, and which is capable of multicolor illumination display; and a display control unit for, when the incoming-call is received while the main body is in the folded state, (a) having the sub-display device illuminated in a first color when the caller information does not show a caller telephone number, and (b) having the sub-display device illuminated in a second color, which is different to the first color, when the caller information shows the caller telephone number, and having the main display device illuminated when the detection function subsequently detects that the main body has been put into the unfolded state.

According to the stated construction, the illumination color of the sub-display is changed by distinguishing between cases in which the caller's telephone number is notified, and cases in which the caller's telephone number is not notified. Therefore, the user can confirm whether the caller's telephone number is notified at a glance according to the color, without having to strain their eyes to read the display content on the sub-display.

(2) Furthermore, in the folding communication terminal in (1), when the display control unit has the main display device illuminated, the main display device may be illuminated in a color which is substantially a same color as the second color.

According to the stated construction, consistency between the illumination colors of the sub display and the main display is maintained, therefore usability is improved.

(3) Furthermore, in the folding communication terminal in (1), when the detection function detects that the main body is in the unfolded state, the display control unit may stop the sub-display device being illuminated.

According to the stated construction power is conserved, resulting in the battery being able to be used continuously for a longer amount of time, in addition to the effect of (1).

(4) Furthermore, in the folding communication terminal in (1), when the display control unit has the main display device illuminated, the main display device may be illuminated in a color which is substantially a same color as the second color.

According to the stated construction, consistency between the illumination colors of the sub display and the main display is maintained, therefore usability is improved.

(5) The communication terminal of the present invention receives caller information during reception of an incoming-call, and has a detection function for detecting whether a main body of the communication terminal is in a folded state or in an unfolded state, including: a telephone directory memory for storing at least one telephone number; a main display device which is visible to a user only when the main body is in the unfolded state, and which is capable of multicolor illumination display; a sub-display device which is visible to the user when the main body is in the folded state, and which is capable of multicolor illumination display; a registration judgement unit for judging, when the incoming-call is received while the main body is in the folded state and if the caller information shows a caller telephone number, whether a same telephone number as the caller telephone number is stored in the telephone directory memory; and a display control unit for (a) having the sub-display device illuminated in a first color, when the registration judgement unit judges that the same telephone number is not stored in the telephone directory memory, and (b) having the sub-display device illuminated in a second color, which is different to the first color, when the judgement unit judges that the same telephone number is stored in the telephone directory memory, and having the main display device illuminated when the detection function detects subsequently detects that the main body is in the unfolded state.

According to the stated construction, the illumination color of the sub-display is changed by distinguishing between cases in which the caller's telephone number is registered in the telephone directory memory, and cases in which the caller's telephone number is not registered in the telephone directory memory. Therefore, the user can confirm whether the caller's telephone number is notified at a glance according to the color, without having to strain their eyes to read the display content on the sub-display.

(6) Furthermore, in the communication terminal of (5), the display control unit may have the main display device illuminated, the main display device is illuminated in a color which is substantially a same color as the second color.

According to the stated construction, consistency between the illumination colors of the sub display and the main display is maintained, therefore usability is improved.

(7) Furthermore, in the communication terminal of (5), when the detection function detects that the main body is in the unfolded state, the display control unit may stop the sub-display device being illuminated.

According to the stated construction, power is conserved, resulting in the battery being able to be used continuously for a longer amount of time, in addition to the effect of (5).

(8) Furthermore, in the communication terminal of (7), when the display control unit has the main display device illuminated, the main display device may be illuminated in a color which is substantially a same color as the second color.

According to the stated construction, consistency between the illumination colors of the sub display and the main display is maintained, therefore usability is improved.

(9) The communication terminal of the present invention receives caller information when receiving an incoming-call, and has a detection function which detects whether a main body of the communication terminal is in a folded state or an unfolded state, including: a telephone directory memory for storing at least one telephone number in correspondence with color specification information; a main display device which is visible to a user only when the main body is in the unfolded state, and which is capable of multicolor illumination display; a sub-display device which is visible to the user when the main body is in the folded state, and which is capable of multicolor illumination display; a registration judgement unit for judging, when the incoming-call is received while the main body is in the folded state and if the caller information shows a caller telephone number, whether a same telephone number as the caller telephone number is stored in the telephone directory memory; and a display control unit for (a) having the sub-display device illuminated in a first color, when the registration judgement unit judges that the same telephone number is not stored in the telephone directory memory, and (b) having the sub-display device illuminated, when the registration judgement unit judges that the same telephone number is stored in the telephone directory memory, in a color specified by the color specification information that is stored in correspondence with the same telephone number, and having the main display device illuminated when the detection function subsequently detects that the main body is in the unfolded state.

According to the stated construction, the sub-display is illuminated in a specified color on reception of a call according to the caller's telephone number, by the user specifying the illumination color in correspondence with the telephone in advance. Therefore, the user can confirm that the call is from a predetermined caller at a glance according to the color, without having to strain their eyes to read the display content on the sub-display.

(10) Furthermore, in the communication terminal of (9), when the display control unit has the main display device illuminated, the main display device may be illuminated in a color which is substantially a same color as the second color.

According to the stated construction, consistency between the illumination colors of the sub display and the main display is maintained, therefore usability is improved.

(11) Furthermore, in the communication terminal of (9), when the detection function detects that the main body is in the unfolded state, the display control unit may stop the sub-display device being illuminated.

According to the stated construction, power is conserved, resulting in the battery being able to be used continuously for a longer amount of time, in addition to the effect of (9).

(12) Furthermore, in the communication terminal of (11), when the display control unit has the main display device illuminated, the main display device may be illuminated in a color which is substantially a same color as the second color.

According to the stated construction, consistency between the illumination colors of the sub display and the main display is maintained, therefore usability is improved.

(13) The communication terminal of the present invention is a foldable communication terminal which has a function for displaying notification information, including: a switch for receiving an operation from a user when a main body of the communication terminal is in a folded state; a judgement unit for judging, consequent to the operation of the switch, whether there is notification information that is yet to be displayed; a selection unit for selecting (a) a first color, when the judgement unit judges that there is no notification information that is yet to be displayed, and (b) a second color, which is different to the first color, when the judgement unit judges that there is notification information that is yet to be displayed; and a display device which is visible to the user when the main body is in the folded state, and which illuminates in the color selected by the selection unit.

According to the stated construction, the display is illuminated distinguishing between whether there is undisplayed notification information or not in response to an operation of the switch by the user. Therefore, the user can know whether there is undisplayed notification information or not at a glance by the color of the display, without having to unfold the communication terminal every time, and without having to strain their eyes.

(14) The communication terminal of the present invention is a foldable communication terminal which has a function for displaying a plurality of types of notification information, including: a switch for receiving an operation from a user when a main body of the communication terminal is in a folded state; a judgement unit for judging, consequent to the operation of the switch and if there is notification information that is yet to be displayed, a type of notification information that is yet to be displayed; a selection unit for selecting a color according to the type judged by the judgment unit; and a display device which is visible to the user when the main body is in the folded state, and which illuminates in the color selected by the selection unit.

According to the stated construction, the display is illuminated distinguishing between types of undisplayed notification information in response to an operation of the switch by the user. Therefore, the user can know the type of undisplayed notification information at a glance by the color of the display, without having to unfold the communication terminal every time, and without having to strain their eyes.

(15) The communication terminal of the present invention is a foldable communication terminal which has a function for displaying a plurality of types of notification information, including: a switch for receiving an operation from a user when a main body of the communication terminal is in a folded state; a counting unit for counting, consequent to the operation of the switch and if there is notification information that is yet to be displayed, a number of types of notification information that are yet to be displayed; a selection unit for selecting a color according to the number counted by the counting unit; and a display device which is visible to the user when the main body is in the folded state, and which illuminates in the color selected by the selection unit.

According to the stated construction, the display is illuminated distinguishing between number of types of undisplayed notification information in response to an operation of the switch by the user. Therefore, the user can know the number of types of undisplayed notification information at a glance by the color of the display, without having to unfold the communication terminal every time, and without having to strain their eyes.

(16) The display control method of the present invention is a display control method for use with a communication terminal, the communication terminal (a) receiving caller information when receiving an incoming-call, (b) being foldable, (c) being composed of (i) a main display device which is visible to a user only when a main body of the communication terminal is in an unfolded state and which is capable of multicolor illumination display, and (ii) a sub-display device which is visible to the user when the main body is in a folded state and which is capable of multicolor illumination display, and (d) having a detection function for detecting whether the main body is in the folded state or in the unfolded state, the display control method including: a first illumination step for having the sub-display device illuminated in a first color when the caller information does not show a caller telephone number; and a second illumination step for having the sub-display device illuminated in a second color, which is different to the first color, when the caller information shows the caller telephone number, and having the main display device illuminated when the detection function subsequently detects that the main body is in the unfolded state.

According to the stated method, the same effect as (1) is obtained.

(17) Furthermore, in the display control method of (16), when the second illumination step has the main display device illuminated, the main display device may be illuminated in a color which is substantially a same color as the second color.

According to the stated method, the same effect as (2) is obtained.

(18) Furthermore, the display control method of (16) may further include a turning-off step for stopping, when the detection function detects that the main body is in the unfolded state, the sub-display device being illuminated.

According to the stated method, the same effect as (3) is obtained.

(19) Furthermore, in the display control method of (18), when the second illumination step has the main display device illuminated, the main display device may be illuminated in a color which is substantially a same color as the second color.

According to the stated method, the same effect as (4) is obtained.

(20) The display control method of the present invention is a display control method for use with a communication terminal, the communication terminal (a) receiving caller information when receiving an incoming-call, (b) being foldable, (c) being composed of (i) a telephone directory memory for storing at least one telephone number, (ii) a main display device which is visible to a user only when a main body of the communication terminal is in an unfolded state and which is capable of multicolor illumination display, and (iii) a sub-display device which is visible to the user when the main body is in a folded state and which is capable of multicolor illumination display, and (d) having a detection function for detecting whether the main body is in the folded state or in the unfolded state, the display control method including: a registration judgement step for judging, when the incoming-call is received while the main body is in the folded state and if the caller information shows a caller telephone number, whether a same telephone number as the caller telephone number is stored in the telephone directory memory; a first illumination step for having the sub-display device illuminated in a first color, when the registration judgement step judges that the same telephone number is not stored in the telephone directory memory; and a second illumination step for having the sub-display device illuminated in a second color, which is different to the first color, when the registration judgement step judges that the same telephone number is stored in the telephone directory memory, and having the main display device illuminated when the detection function subsequently detects that the main body is in the unfolded state.

According to the stated method, the same effect as (5) is obtained.

(21) Furthermore, in the display control method of (20), when the second illumination step has the main display device illuminated, the main display device may be illuminated in a color which is substantially a same color as the second color.

According to the stated method, the same effect as (6) is obtained.

(22) Furthermore, the display control method of (20) may further include a turning-off step for stopping, when the detection function detects that the main body is in the unfolded state, the sub-display device being illuminated.

According to the stated method, the same effect as (7) is obtained.

(23) Furthermore, in the display control method of (22), when the second illumination step has the main display device illuminated, the main display device is illuminated in a color which is substantially a same color as the second color.

According to the stated method, the same effect as (8) is obtained.

(24) The display control method of the present invention is a display control method for use with a communication terminal, the communication terminal (a) receiving caller information when receiving an incoming-call, (b) being foldable, (c) being composed of (i) a telephone directory memory for storing at least one telephone number in correspondence with color specification information, (ii) a main display device which is visible to a user only when a main body of the communication terminal is in an unfolded state and which is capable of multicolor illumination display, and (iii) a sub-display device which is visible to the user when the main body is in a folded state and which is capable of multicolor illumination display, and (d) having a detection function for detecting whether the main body is in the folded state or in the unfolded state, the display control method including: a registration judgement step for judging, when the incoming-call is received while the main body is in the folded state and if the caller information shows a caller telephone number, whether a same telephone number as the caller telephone number is stored in the telephone directory memory; a first illumination step for having the sub-display device illuminated in a first color, when the registration judgement step judges that the same telephone number is not stored in the telephone directory memory; and a second illumination step for having the sub-display device illuminated, when the registration judgement step judges that the same telephone number is stored in the telephone directory memory, in a color specified by the color specification information that is stored in correspondence with the same telephone number, and having the main display device illuminated when the detection function subsequently detects that the main body is in the unfolded state.

According to the stated method, the same effect as (9) is obtained.

(25) Furthermore, in the display control method of (24), when the second illumination step has the main display device illuminated, the main display device may be illuminated in a color which is substantially a same color as the second color.

According to the stated method, the same effect as (10) is obtained.

(26) Furthermore, the display control method of (24) may further include a turning-off step for stopping, when the detection function detects that the main body is in the unfolded state, the sub-display device being illuminated.

According to the stated method the same effect as (11) is obtained.

(27) Furthermore, in the display control method of (26), when the second illumination step has the main display device illuminated, the main display device is illuminated in a color which is substantially a same color as the second color.

According to the stated method, the same effect as (12) is obtained.

(28) The display control method of the present invention is a display control method used for a communication terminal, the communication terminal (a) being foldable, (b) being composed of (i) a switch for receiving an operation from a user when a main body of the communication terminal is in a folded state, and (ii) a display device which is visible to the user when the main body is in the folded state and which is capable of multicolor illumination display, and (c) having a display function for displaying notification information, the display control method including: a judgement step for judging, consequent to the operation of the switch, whether there is notification information that is yet to be displayed; a selection step for selecting (a) a first color, when the judgement step judges that there is no notification information that is yet to be displayed, and (b) a second color, which is different to the first color, when the judgement step judges that there is notification information that is yet to be displayed; and a display control step for having the display device illuminated in the color selected by the selection step.

According to the stated method, the same effect as (13) is obtained.

(29) The display control method of the present invention is a display control method used for a communication terminal, the communication terminal (a) being foldable, (b) being composed of (i) a switch for receiving an operation from a user when a main body of the communication terminal is in a folded state, and (ii) a display device which is visible to the user when the main body is in the folded state and which is capable of multicolor illumination display, and (c) having a display function for displaying a plurality of types of notification information, the display control method including: a judgement step for judging, consequent to the operation of the switch and if there is notification information that is yet to be displayed, a type of the notification information that is yet to be displayed; a selection step for selecting a color according to the type judged in the judgement step; and a display control step for having the display device illuminated in the color selected by the selection step.

According to the stated method, the same effect as (14) is obtained.

(30) The display control method of the present invention is a display control method used for a communication terminal, the communication terminal (a) being foldable, (b) being composed of (i) a switch for receiving an operation from a user when a main body the communication terminal is in a folded state, and (ii) a display device which is visible to the user when the main body is in the folded state and which is capable of multicolor illumination display, and (c) having a display function for displaying a plurality of types of notification information, the display control method including: a counting step for counting, consequent to the operation of the switch and if there is notification information yet to be displayed, a number of the types of notification information yet to be displayed; a selection step for selecting a color according to the number judged in the judgement step; and a display control step for having the display device illuminated in the color selected by the selection step.

According to the stated method, the same effect as (15) is obtained.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 is a screen display example of the main display;

FIG. 10 is an example of incoming-communication history information;

FIG. 13 is a screen display example of the sub-display and the main display;

FIG. 15 is yet another screen display example of the sub-display and the main display;

FIG. 18 is a flowchart showing the details of yet another illumination color selection.

DESCRIPTION OF THE PREFERRED EMBODIMENT

1. First Embodiment

The following described the first embodiment of the folding communication terminal of the present invention, with reference to the drawings.

1.1 Appearance

Figure 1:
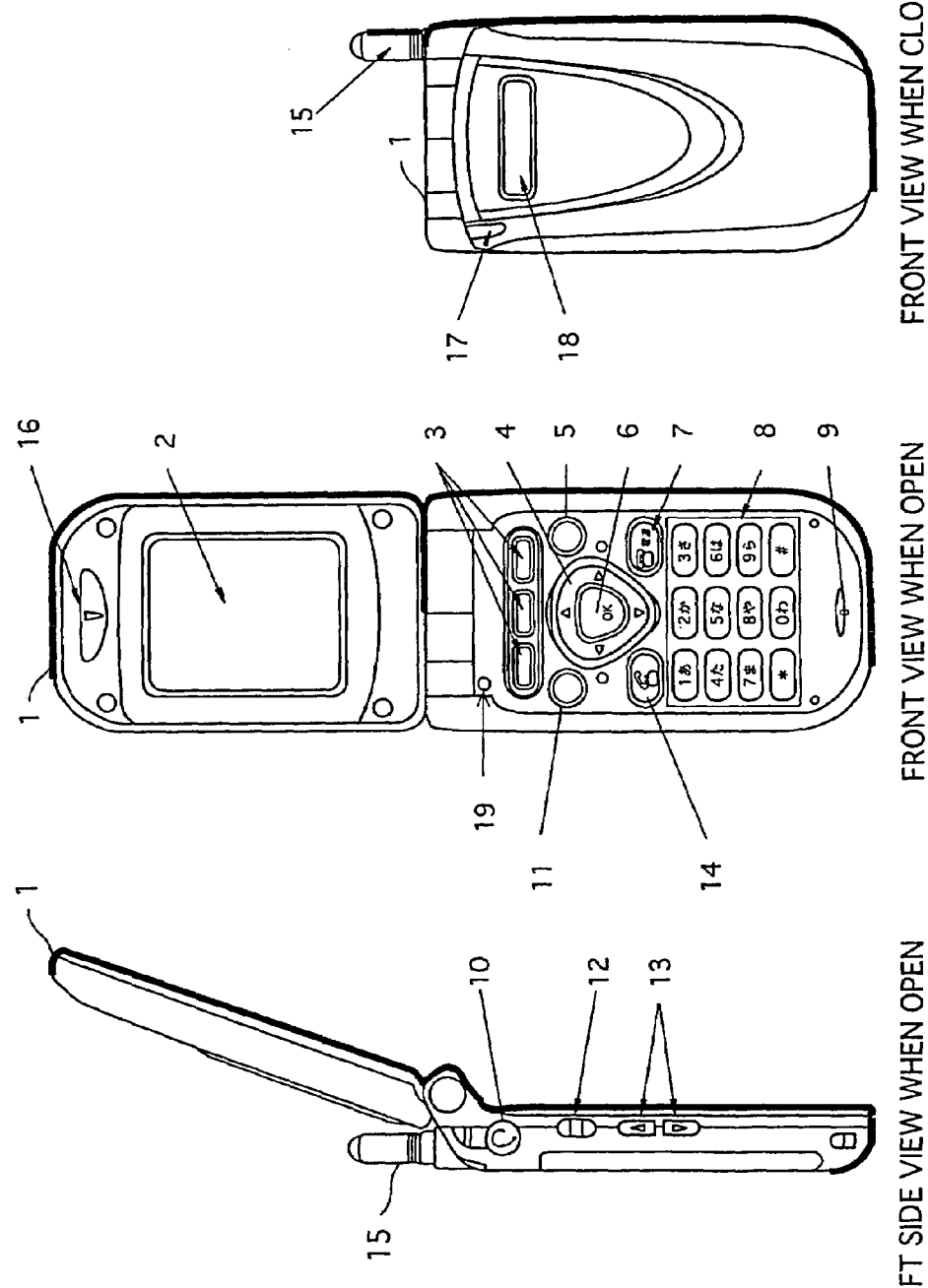
FIGS. 1a, 1b, and 1c are outer views of the folding communication terminal of the present invention.

FIGS. 1a, 1b, and 1c are outer views of the folding communication terminal of the present invention. FIG. 1a is a front view when unfolded (hereinafter "unfolded" will also be called "open"), FIG. 1b is a left side view when unfolded, and FIG. 1c is a front view when folded (hereinafter "folded" will also be called "closed").

1 is the main body of the folding communication terminal.

2 is a main display which is a self-luminous or lighted multicolored luminous display, and is composed of a lighted color LCD display device, a DMD (Digital Micromirror Device), an organic EL (ElectroLuminescent) display device, and so on. The main display 2 displays various types of information to the user including the present time, electric field strength, and information about callers. The main display 2 performs luminous display of the information in a display color specified by a control unit 20, which will be explained later. Note that the display content of the main display 2 cannot be confirmed when the folding communication terminal 1 is in the closed state, so the main display 2 is turned off to conserve power.

3 is a flexible key which is for selecting items displayed on a lower part of the main display 2.

4 is a 4-position key which moves left, right, up, and down, and is for scrolling through display content.

5 is an e-mail key which is used when proceeding to an e-mail function display screen.

6 is a menu/OK key positioned in the center of the 4-position key which is for proceeding to a menu item and for confirming a selected item.

7 is an power/end key which is for turning the power on and off, and is used to end a conversation.

8 is a numeric keypad which is for inputting telephone numbers, characters, and so on.

9 is a microphone which is for inputting voices.

10 is an earphone terminal cover which protects an earphone terminal (not illustrated).

11 is a web key which is for activating an Internet connection function, and which is used for having the Internet connection function screen displayed.

12 is a side OK key which is for confirming a selected item, memo reproduction, voice recording, and so on.

13 is a side scroll key which is used for scrolling a displayed page up and down.

14 is a start key which is used when making and receiving calls.

15 is an antenna which is used when receiving and transmitting the necessary radio waves for communication.

16 is a speaker which outputs a ringer sound, a caller's voice, sound notifying reception of various types of messages, and so on.

17 is an incoming-communication lamp which notifies the user when there is incoming-communication by flashing in green, and which glows red during recharging.

18 is a sub-display which is a self-luminous or lighted multicolored luminous display, and is composed of a lighted color LCD display device, a DMD (Digital Micromirror Device), an organic EL (ElectroLuminescent) display device, and so on. The sub-display 18 displays various types of information to the user including the present time, the electric field strength, and information about callers. The sub-display 18 performs illumination display of the information in a display color specified by the control unit 20, which will be explained later.

When the sub-display 18 is composed of a monochrome display device such as a black and white LCD device, it is necessary to provide at least two illumination sources, green and red, in order to differentiate, for example, between cases in which a caller's telephone number is notified and cases in which it is not, or between cases in which there is new information which has not been displayed on the main display 2 and cases in which there is no such information. Alternatively, the sub-display 18 can be equipped with light sources of the three primary colors, and luminous display can be performed in desired colors by changing the luminous intensity ratio of each device appropriately.

Meanwhile, if the sub-display 18 is a color LCD device or the like it is not necessary to provide light sources in a plurality of colors, but is sufficient to provide a single, substantially white illumination source.

Note that when the folding communication terminal 1 is in the open state information is displayed on the main display 2, and the sub-display 18 is turned off to conserve power. Furthermore, if the side OK key 12 or the side scroll key 13 is operated while the sub-display 18 is turned off, the sub-display 18 is turned on and then is turned off again after a predetermined amount of time.

19 is an open/close detection switch which is a microswitch that detects mechanically whether the folding communication terminal 1 is in an open state or a closed state. However, it is possible to use another well-known means such as an optical sensor or a magnetic sensor which detects that the folding communication terminal 1 has opened, or an encoder which detects the angle of opening.

1.2 Function Structure

Figure 2:
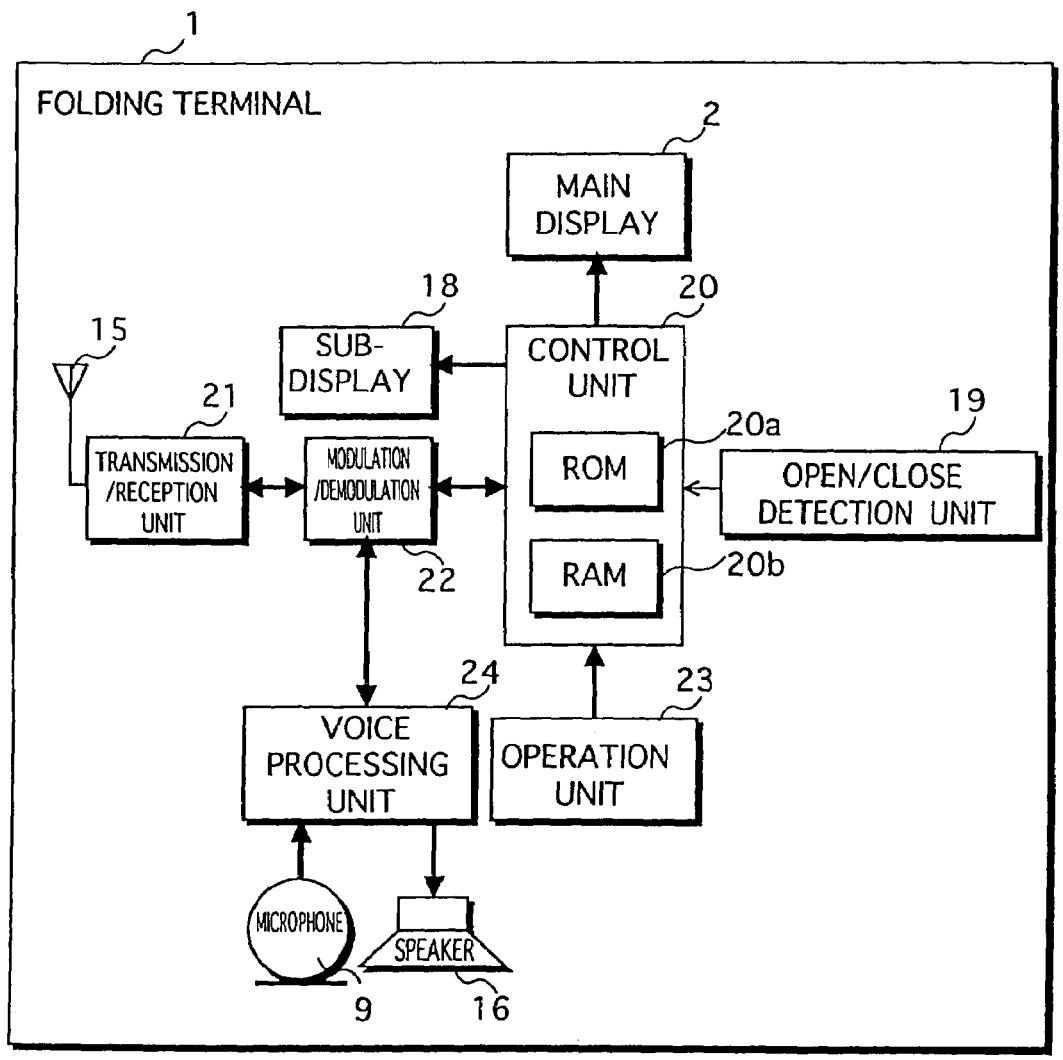
FIG. 2 is a block drawing showing the structure of the folding communication terminal of the present invention.

FIG. 2 is a block drawing showing the functions of the folding communication terminal of the present invention, and shows a case in which the folding communication terminal is applied to an IS(Interim Standard)-95 base CDMA (Code Division Multiple Access) mobile telephone portable terminal. Note that components corresponding to components described above in Appearance have the same numbering as FIG. 1, and therefore an explanation of these components will be omitted.

As shown in FIG. 2, the folding communication terminal 1 is composed of the antenna 15, a transmission/reception unit 21, a modulation/demodulation unit (which includes a base band processing unit for performing CDMA processing) 22, a voice processing unit 24, the microphone 9, the speaker 16, the control unit 20, a main display unit 2, a sub-display unit 18, an operation unit 23, and an open/close detection unit 19.

The control unit 20 realizes its functions according to, for example, a microprocessor, a ROM (Read Only Memory) 20a, a RAM (Random Access Memory) 20b, and so on, and performs various kinds of control according to execution by the microprocessor of a control program stored in the ROM 20a. Furthermore, the RAM 20b functions as an incoming-communication history information memory, and in addition to storing incoming-communication history information temporarily or until a delete or modify operation is performed, the RAM 20b functions as a battery backed-up telephone directory, storing in correspondence telephone numbers, names, and colors to illuminate the displays with when there is an incoming-call. These are registered by the user through the operation unit 23.

The main display unit 2 and the sub-display unit 18 correspond to the main display 2 and the sub-display 18 explained in the Appearance. The open/close detection unit 19 corresponds to the open/close detection switch 19 explained in the Appearance.

The operation unit 23 is composed of the flexible key 3, the 4-position key 4, the e-mail 5, the menu/OK key 6, the end/power key 7, the numeric key pad 8, the web key 11, the side OK key 12, the side scroll key 13, and the start key 14, explained in the Appearance.

The transmission/reception unit 21, the modulation/demodulation unit 22 and the voice processing unit 24 realize their functions by a DSP (Digital Signal Processor), a signal amplifier, and so on, and process reception and transmission signals in the following way.

In the folding communication terminal 1 with the aforementioned structure, a radio wave received by the antenna 15, after being amplified in the transmission/reception unit 21, is demodulated into base band digital audio information or digital data information by obtaining a correlation of the radio wave to a predetermined PN (Pseudo noise) sequence in the modulation/demodulation unit 22. The digital audio information demodulated in the modulation/demodulation unit 22 is supplied to the voice processing unit 24, and under the control of the control unit 20 is converted to an analog signal in the voice processing unit 24, and electric-acoustic converted and output by the speaker 16.

Furthermore, digital data information which is demodulated by the modulation/demodulation unit 22 is supplied to the control unit 20. One example of the digital data information is incoming-communication notification information which expresses that there is an incoming call to the folding communication terminal and information about the caller (the caller's telephone number or a telephone number non-notification reason code). Another example of this incoming-communication notification information is sent according to a so-called SMS dealer (short message service dealer) when there is e-mail or character mail sent to the mail server for the folding communication terminal 1. The incoming-communication notification information is supplied to and displayed by the main display unit 2 and the sub-display unit 18, and is also stored in the RAM 20a.

Meanwhile, input sound is acoustic-electric converted in the microphone 9, digitally converted to a base band digital voice signal in the voice processing unit 24, and supplied to the modulation/demodulation unit 22. Furthermore, information input through the operation unit 23 is stored in the RAM 20b via the control unit 20 as required and also converted to a base band digital signal, and then supplied to the modulation/demodulation unit 22. The modulation/demodulation unit 22 modulates the supplied digital voice signal and digital data signal by multiplying them with a predetermined PN sequence signal. The transmission reception unit 21 amplifies the modulated signal, and transmits the signal from the antenna 15.

1.3 Telephone Directory Information

Figure 3:
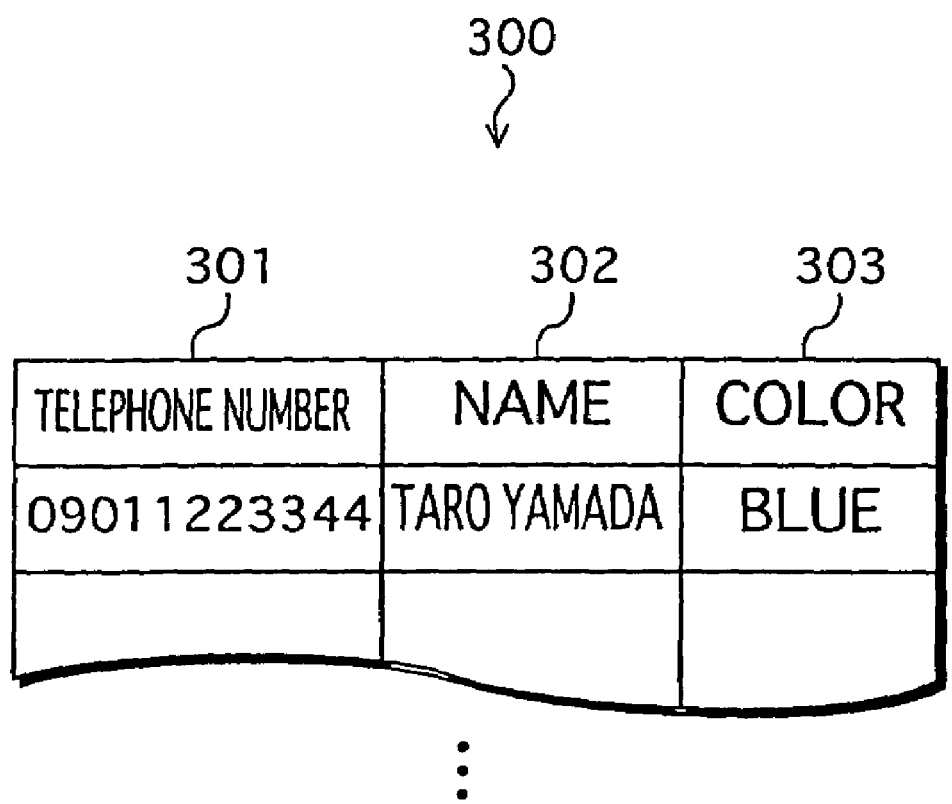
FIG. 3 is an example of telephone directory information.

FIG. 3 shows an example of telephone directory information which is written in a telephone directory memory that in realized in the RAM 20b, and is stored following a format shown by telephone directory table 300.

In the telephone directory table 300 a telephone number column 301 retains telephone numbers, a name column 302 retains names which correspond to each of the telephone numbers, and a color column 303 retains colors with which the display is illuminated in correspondence with each of the telephone numbers.

The telephone directory information is input by the user through the operation unit 23, and is stored in the telephone directory table 300.

1.4 Operation

The following explains the operation of the present invention of the folding communication apparatus with the above-described structure with reference to a flowchart and screen display examples.

Figure 4:
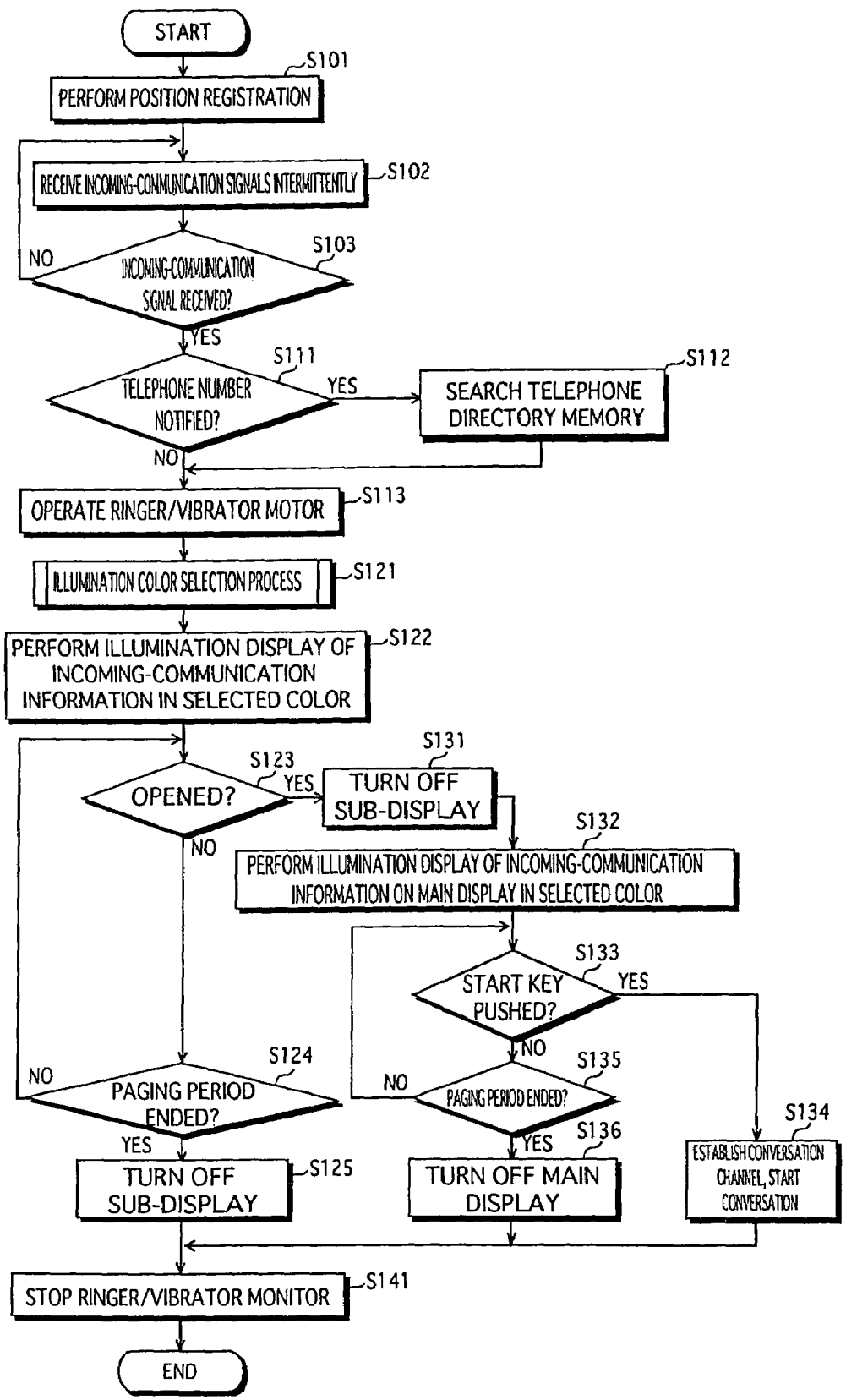
FIG. 4 is a flowchart showing the overall operations of the first embodiment of the present invention.

FIG. 4 is a flowchart showing the overall operations of the present invention of the folding communication terminal.

Figure 5:
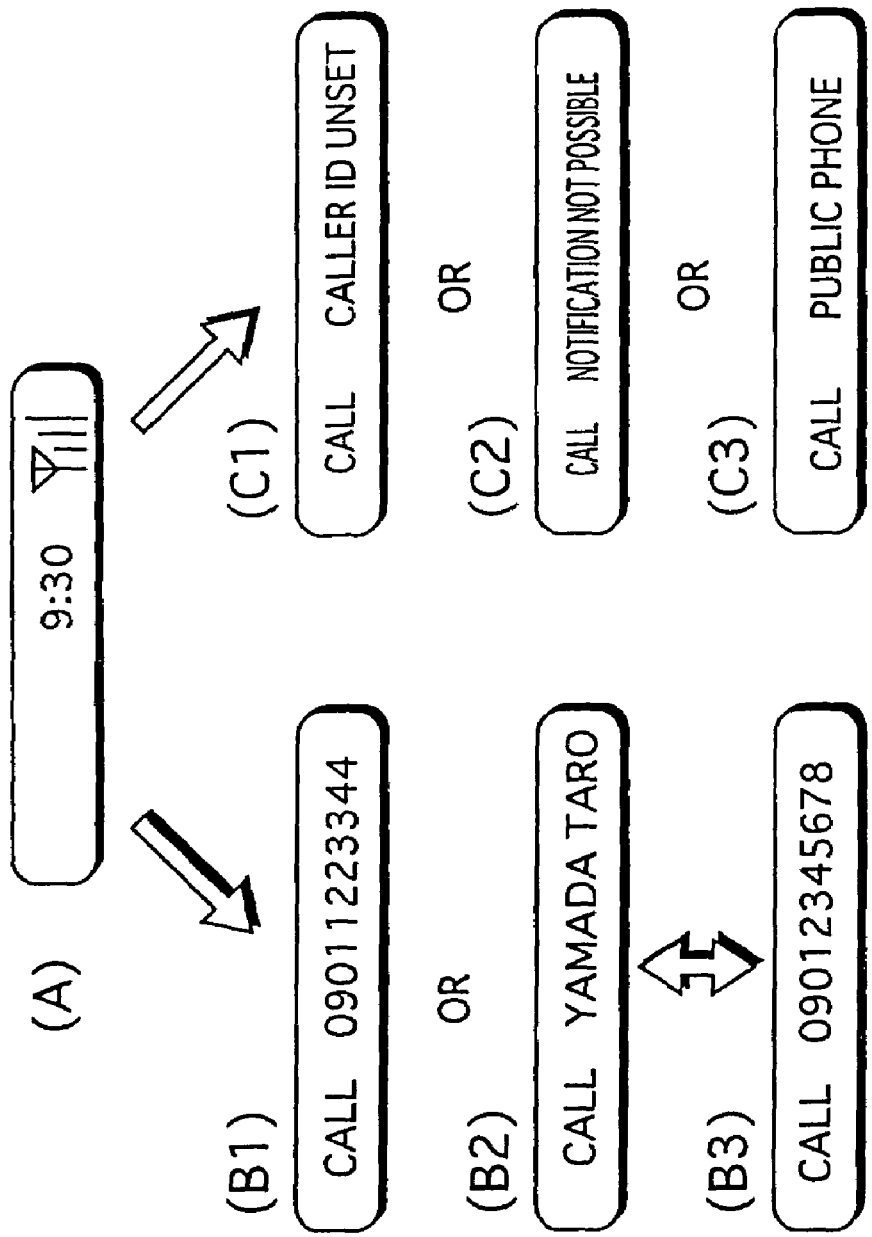
FIG. 5 is a screen display example of the sub-display.

FIG. 5 is a screen display example of the sub-display 18.

FIG. 6 is a screen display example of the main display 2.

1.4.1 Stand-by Processing

After having its power turned on or on detecting a new radio wave from a base station (not illustrated), the folding communication terminal 1 performs position registration with the base station by transmitting and receiving signals in a predetermined series of procedures according to the control of the control unit 20 (Step S101), and moves into stand-by. In stand-by the folding communication terminal 1 intermittently receives incoming-communication reception signals transmitted from the base station (Step S102). It is supposed here that the folding communication terminal 1 is in the closed state (in other words, the state shown in FIG. 1c) at this point.

(A) in FIG. 5 shows a display screen on the sub-display 18 when the folding communication terminal 1 is in the closed state in stand-by mode. The control unit 20 obtains the present time and the electric field strength from a clock circuit and an RSSI (received signal strength indication) detection unit respectively (neither is illustrated), and displays stand-by information which includes the present time (9:30 in the example) and an antenna pictograph expressing the electric field strength (Step 103). In addition, although not shown in the drawing, the blank space to the left of the time may be used to display icons expressing the state of set up of the terminal and whether there is incoming-mail history information. Note that since the clock circuit and the RSSI detection unit are components that are conventionally generally contained in communication terminals an explanation will be omitted.

1.4.2 Incoming-communication Processing

The following is a detailed explanation of the operation of the folding communication terminal 1 when the user is being paged, while an incoming-communication notification signal for a call is received and the folding communication terminal 1 is in a closed state. Note that the fact that the folding communication terminal 1 is in a closed state is detected and notified to the control unit 20 by the open/closed detection unit 19.

When an incoming-communication notification signal for a call is received while the folding communication terminal 1 is in stand-by (Step S104), the control unit 20 judges whether the caller information included in the received incoming-communication notification signal shows the caller's telephone number (Step S111). If the judgement is positive the control unit 20 retrieves the name and the color retained in correspondence with the caller's telephone number from the telephone directory memory (Step S112).

The control unit 20, according to whether settings permit output of sound, outputs a predetermined ringer (a ringer melody or the like) or operates a vibrator motor to start paging the user (Step 113).

Then while paging the user, the control unit 20 performs luminous display of the incoming-communication information on the sub-display 18 and the main display 2 following the following procedure.

1.4.3 Illumination Color Selection Process

The control unit 20 invokes the illumination color selection process (Step S121).

Figure 7:
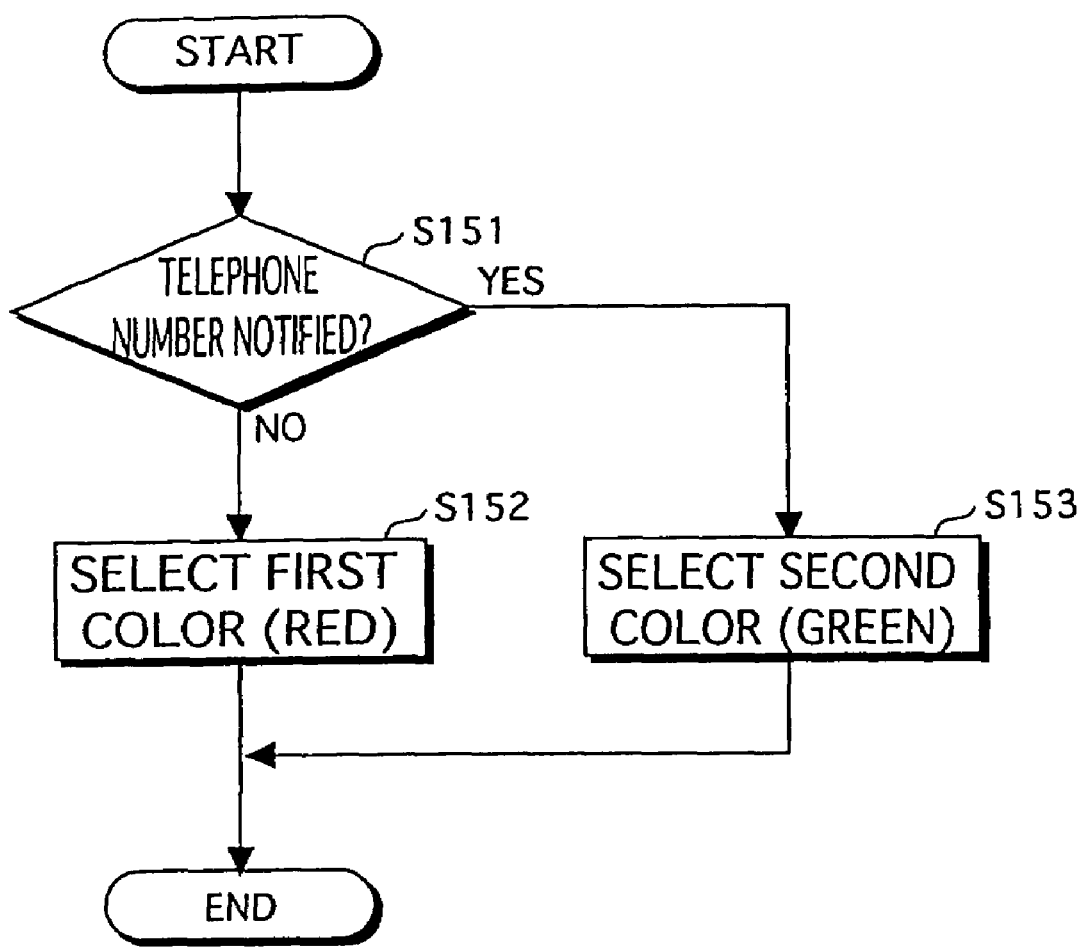
FIG. 7 is a flowchart showing the details of an illumination color selection process.

FIG. 7 is a flowchart showing the illumination color selection process.

The control unit 20 judges whether the caller's telephone number is shown in the caller information (Step S151). If the judgement is negative the control unit 20 selects red which is the first color (Step S152). Meanwhile, if the judgement is positive the control unit 20 selects green which is the second color (Step S153).

1.4.4 Process for Displaying Incoming-communication Information on the Sub-display Next, returning to the flowchart in FIG. 4, the control unit 20 has incoming-communication information displayed flashing on the sub-display 18, and had the sub-display 18 illuminated with the color selected in the illumination color selection process (Step S122).

FIG. 5 (B1) through to (B3) show the display content when the caller's telephone number is notified. When the control unit 20 judges that the notified telephone number is not registered in the telephone directory number, it has the telephone number displayed flashing (FIG. 5 (B1)). When the control unit 20 judges that the telephone number is registered, it has the telephone number and the name registered in correspondence with the telephone number in the telephone directory memory (in this case "Taro Yamada") displayed flashing repeatedly in alternation (FIG. 5 (B2) and (B3)).

In each case the control unit 20 has the sub-display 18 illuminated in green which is chosen in the illumination color selection process.

On the other hand, (C1) to (C3) in FIG. 5 show the display content when a telephone number non-notification reason code is notified. When the non-notification reason code shows that the caller ID is unset, the control unit 20 has the content of (C1) displayed flashing. When the reason code shows that the call is from a terminal which does not have a caller ID function, the control unit 20 has the content of (C2) displayed flashing. When the reason code shows that the call is from a public telephone, the control unit has the content of (C3) displayed flashing.

In each case the control unit 20 has the sub-display 18 illuminated in red which is chosen in the illumination color selection process.

If the folding communication terminal 1 is put into the open state while the display of any of (B1) to (C3) is being performed, the control unit 20 detects that the folding communication terminal 1 is in an open state (in other words the state in FIG. 1a or 1b) according to the open/close detection switch 19 (Step S123), turns the sub-display 18 off (Step S131), and displays incoming-communication information on the main display 2.

Furthermore, when the paging ends (Step S124), the control unit 20 turns the sub-display 18 off (Step S141), and stops the ringer or the vibrator motor (Step S141).

1.4.5 Incoming-communication Information Display Process on the Main Display After the folding communication terminal 1 is put into the open state, the control unit 20 displays flashing on the main display 2 incoming-communication information corresponding to the content that was being displayed on the sub-display 18, and has the main display 2 illuminated in the color chosen in the illumination color selection process (Step S122).

FIG. 6 (B1) and (B2) show display contents when a caller's telephone number is notified. When the control unit 20 judges that the notified telephone number is not registered in the telephone directory memory, it has the telephone number displayed flashing (FIG. 6 (B1)). When the control unit 20 judges that the telephone number is registered, it has the telephone number and the name registered in correspondence with the telephone number in the telephone directory memory (in this case "Taro Yamada") displayed flashing (FIG. 6 (B2)).

In each case the control unit 20 has the main display 2 illuminated in green which is chosen in the illumination color selection process.

On the other hand, FIG. 6 (C1) to (C3) show the display content when a telephone number non-notification reason code is notified. When the non-notification reason code shows that the caller ID is unset, the control unit 20 has the content of FIG. 6 (C1) is displayed flashing. When the reason code shows that the call is from a terminal which does not have a caller ID function, the control unit 20 has the content of FIG. 6 (C2) displayed flashing. When the reason code shows that the call is from a public telephone, the control unit has the content of FIG. 6 (C3) displayed flashing.

In each case the control unit 20 has the main display 2 illuminated in red which is chosen in the illumination color selection process.

If the user pushes the start key 14 of the operation unit 23 while the display state is any of those shown in FIG. 6 (B1) to (C3) (Steps 133), the control unit 20 controls the transmission/reception unit 21 and the modulation/demodulation unit 22 to establish a wireless connection on the call channel, initiating a call to the caller (step S134).

Furthermore, if the paging ends without the start key 14 having been pushed (Step S135), the control unit turns the main display 2 off (step S136), and stops the ringer or the vibrator motor (Step S141).

1.5 Modifications of the Illumination Color Selection Process

Figure 8:
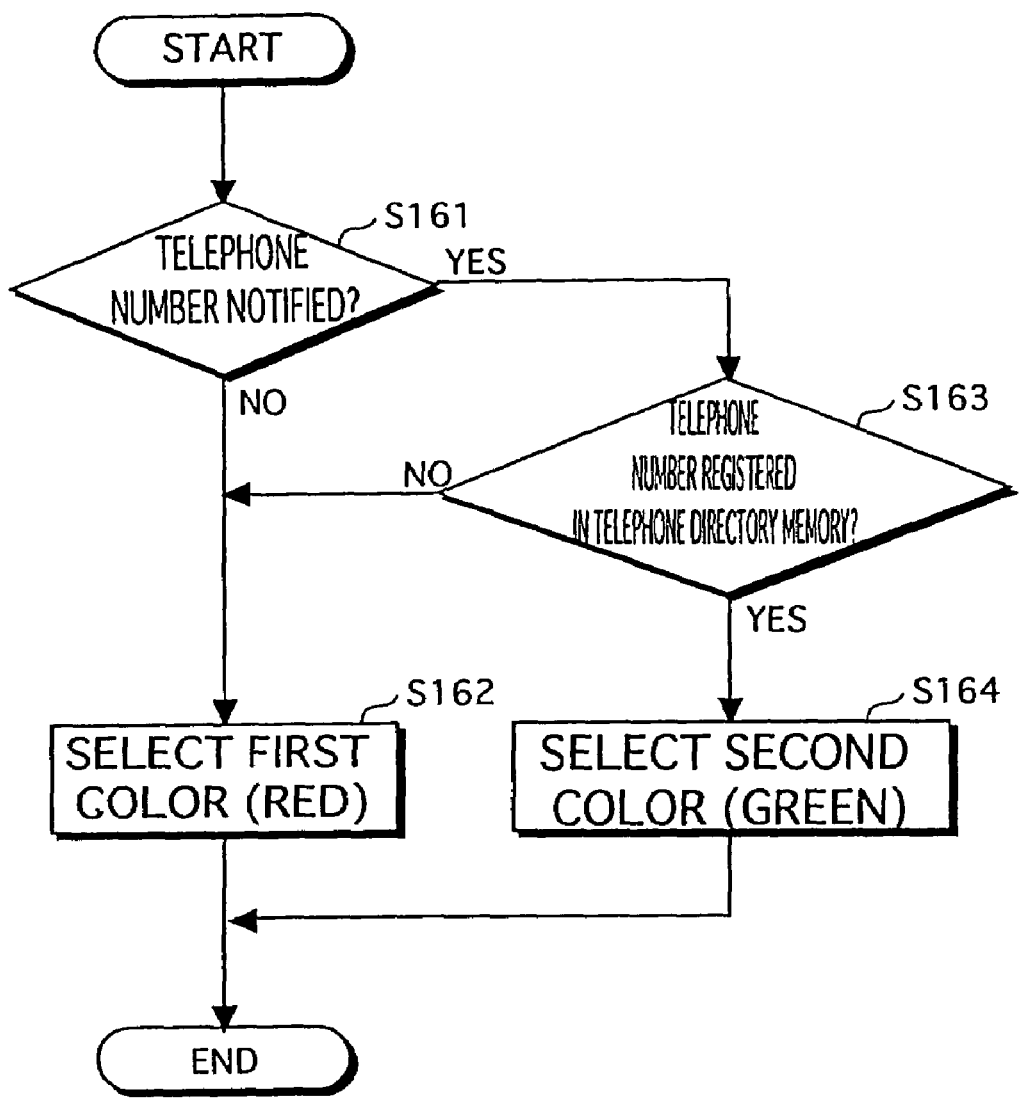
FIG. 8 is a flowchart showing the details of another illumination color selection process.

FIG. 8 is a flowchart showing another illumination color selection process in detail. This process is invoked at Step S121 in FIG. 4 instead of the illumination color selection process shown in FIG. 7.

In the illumination color selection process shown in FIG. 8, the control unit 20 judges whether the caller information notified on receiving a call shows the caller's telephone number (Step S161) and selects the first color red if the caller's telephone number is not shown (Step S162). If the caller's telephone number is shown, the control unit 20 judges whether the telephone number is registered in telephone directory memory (step S163), and selects the first color red if the telephone number is not registered (Step S162), or selects the second color green if the telephone number is registered (Step S164).

With this illumination color selection process, FIG. 5 (B1) is displayed flashing illuminated in red, and FIG. 5 (B2) and (B3) are displayed flashing alternately illuminated in green. Furthermore, FIG. 6 (B1) is displayed flashing illuminated in red, and FIG. 6 (B2) is displayed flashing illuminated in green.

Figure 9:
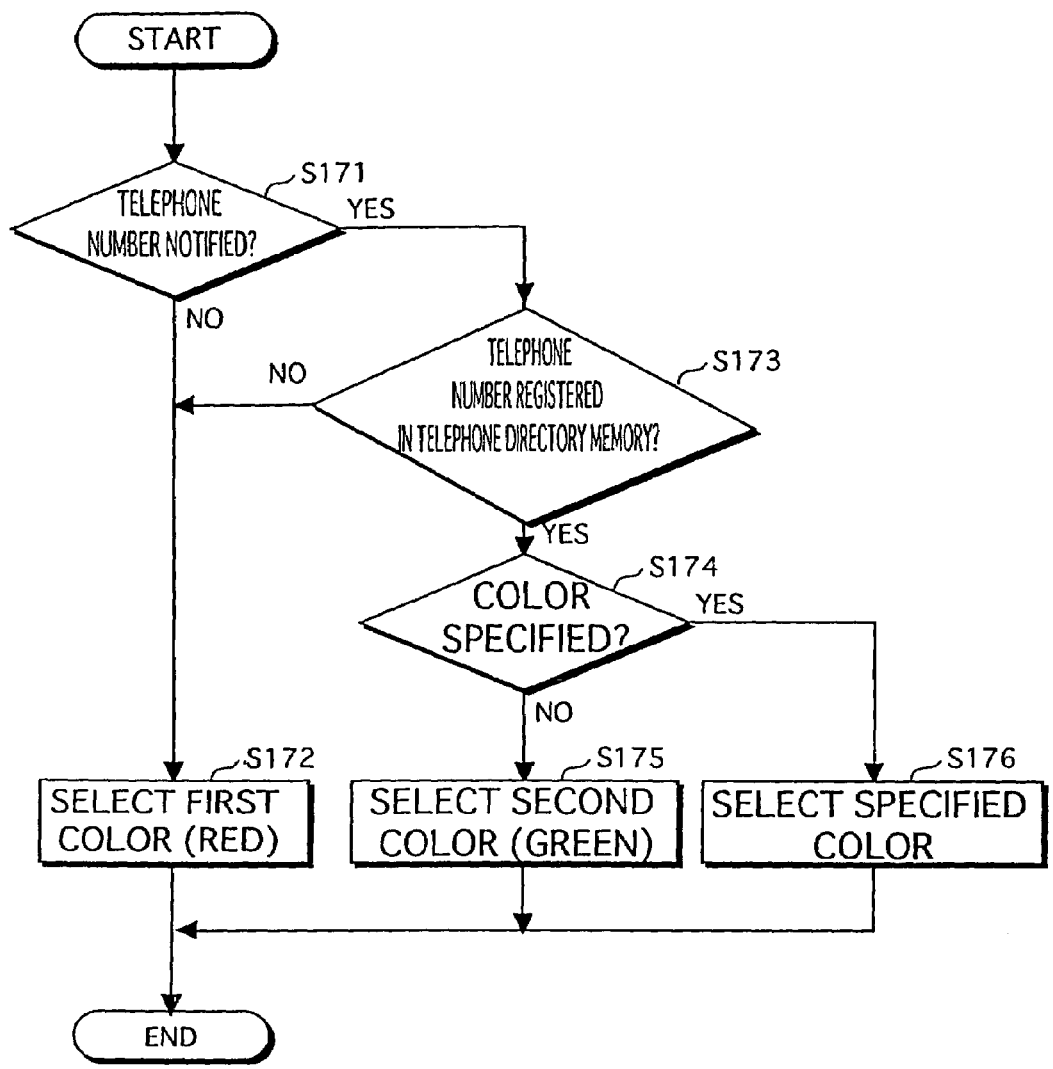
FIG. 9 is a flowchart showing the details of yet another illumination color selection process.

FIG. 9 is a flowchart showing yet another illumination color selection process in detail. This process is invoked at Step S121 in FIG. 4 instead of the illumination color selection processes shown in FIG. 7 and FIG. 8.

In the illumination color selection process in FIG. 9 the control unit 20 judges whether the caller information notified on receiving the call shows the caller's telephone number (Step S171) and selects the first color red if the caller's telephone number is not shown (Step S172). If the caller's telephone number is shown, the control unit judges whether the telephone number is registered in telephone directory memory (step S173), and selects the first color red if the telephone number is not registered (Step S172). If the telephone number is registered, the control unit 20 judges whether color specification information is registered in correspondence with the telephone number (step S174). If color specification information is not registered, the control unit 20 selects the second color green (Step S175), and if color specification information is registered, the control unit 20 selects the specified color (Step S176).

With this illumination color selection process, FIG. 5 (B1) is displayed flashing illuminated in red, and FIG. 5 (B2) and (B3) are displayed in alternation illuminated in green or a specified color (for example, bright pink for the user's girl/boyfriend). Furthermore, FIG. 6 (B1) is displayed flashing illuminated in red.

1.6 Conclusion

As explained, according to the folding communication terminal and the illumination color selection method of the present invention, the color of the incoming-communication display of the main display and the sub-display is changed by distinguishing between when a caller's telephone number is notified and when the telephone number is not notified. Therefore the user can confirm instantly with just a glance at the color whether the caller's telephone number is notified or not.

In addition, the color of the incoming-communication display is changed by distinguishing whether a notified telephone number is registered in the telephone directory memory. Therefore, the user can confirm instantly with just a glance at the color whether the call is from a registered caller.

Furthermore, when the illumination color is specified in correspondence with a notified caller's telephone number the color of the incoming-communication display is changed to the specified color. Therefore, the user can confirm with just a glance at the color that the call is from a specified caller (for example the user's girlfriend/boyfriend, family, and so on).

2. Second Embodiment

The following explains the folding communication terminal of the second embodiment in detail, with reference to the drawings. Note that an explanation of items that are the same as the first embodiment is omitted, and that the explanation is mainly about the differences.

2.1 Appearance

The appearance of the folding communication terminal of the second embodiment is the same as that of the first embodiment.

Incoming-communication history information is displayed on the main display 2, as well as the present time, the electric field strength, caller information and so on. The incoming-communication history information 20 includes incoming-call history information, and incoming-mail history information which shows that there is e-mail or character mail received at the mail server.

The number, type, and reception time of new incoming-communication history information that is yet to be displayed on the main display 2 is displayed on the sub-display 18, as well as the present time, the electric field strength, caller information and so on.

The incoming-communication history information that is displayed on the main display 2 is called detailed information. The number, reception time, and type of the undisplayed incoming-communication history information that is displayed on the sub-display 18 is called simplified information.

2.2 Function Structure

The function structure of the folding communication apparatus of the second embodiment is the same as that of the first embodiment.

2.3 Incoming-communication History Information

FIG. 10 is an example of incoming-communication history information that is written in an incoming-communication history information memory that is realized in the RAM 20b, and that is stored following a format shown by an incoming-communication history information table 400.

There is one row in the incoming-communication history information table 400 for each communication. An information category column 401 retains a symbol "call", "e-mail", or "c-mail" which show respectively that a piece of incoming-communication history information is for a call, an e-mail, or a character mail. A reception date/time column 402 shows the date and time that a communication was received. A caller/sender information column 403 retains information about a caller or a sender of an e-mail or a character message. A response category column 404 maintains, as a symbol showing the users response to incoming-communication, "answered" or "missed" for calls and "read" or "unread" for e-mail and character messages. A subject column 405 retains the subject of e-mails, only for incoming-communication history information regarding e-mail. A display flag 406 retains a symbol "1" or "0" showing whether a piece of incoming-communication history information has been displayed on the main display or not.

The incoming-communication history information is generated by the control unit 20 when an incoming-communication notification signal is received, and is recorded in the incoming-communication history table 400.

2.4 Operation

Next, the operation of the folding communication terminal of the present invention having the above-described structure will be explained with reference to a flowchart and screen display examples.

Figure 11:
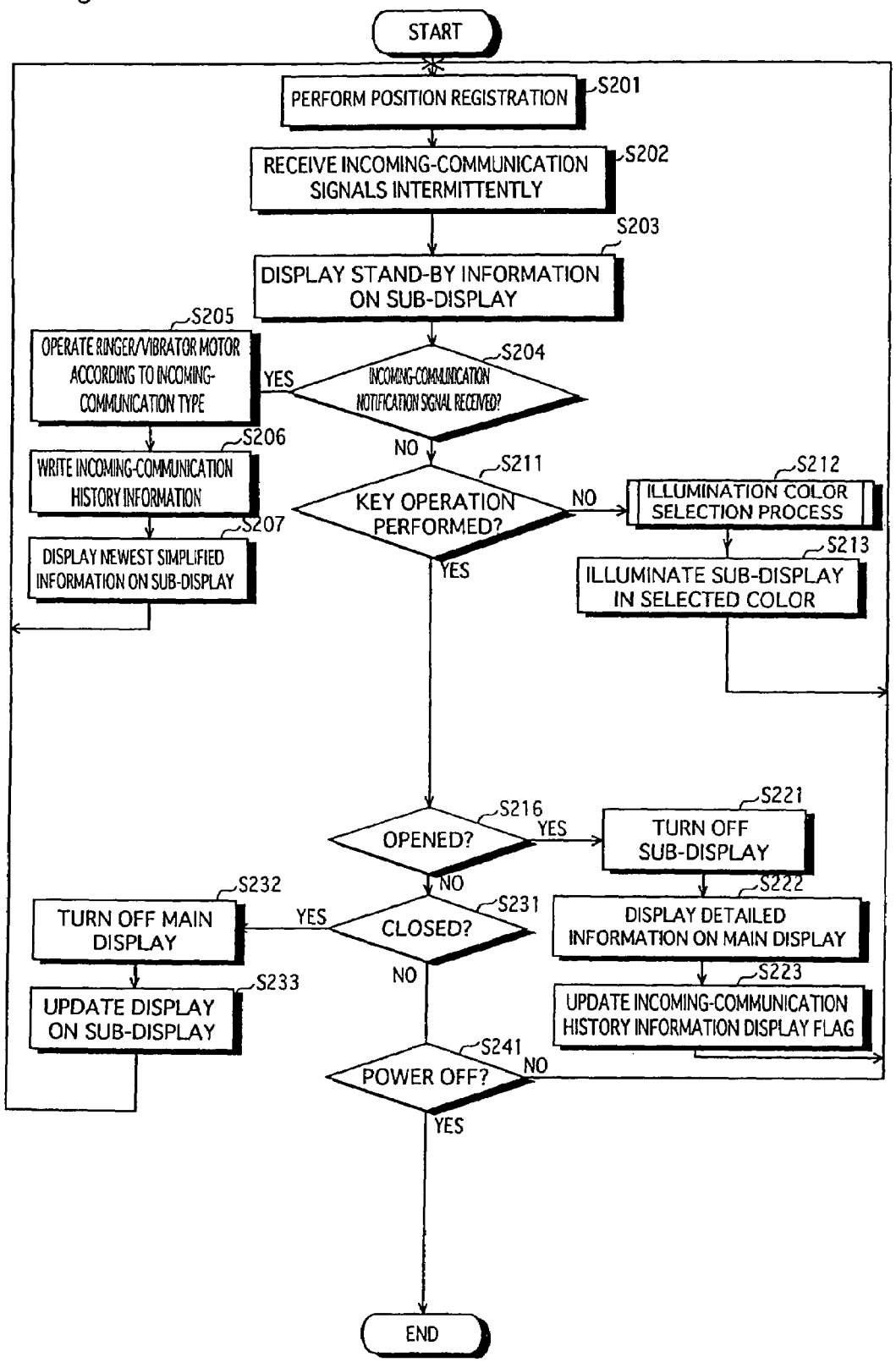
FIG. 11 is a flowchart showing the overall operations of the second embodiment of the present invention.
Figure 12:
FIG. 12 is a screen display example of the sub-display.
Figure 14:
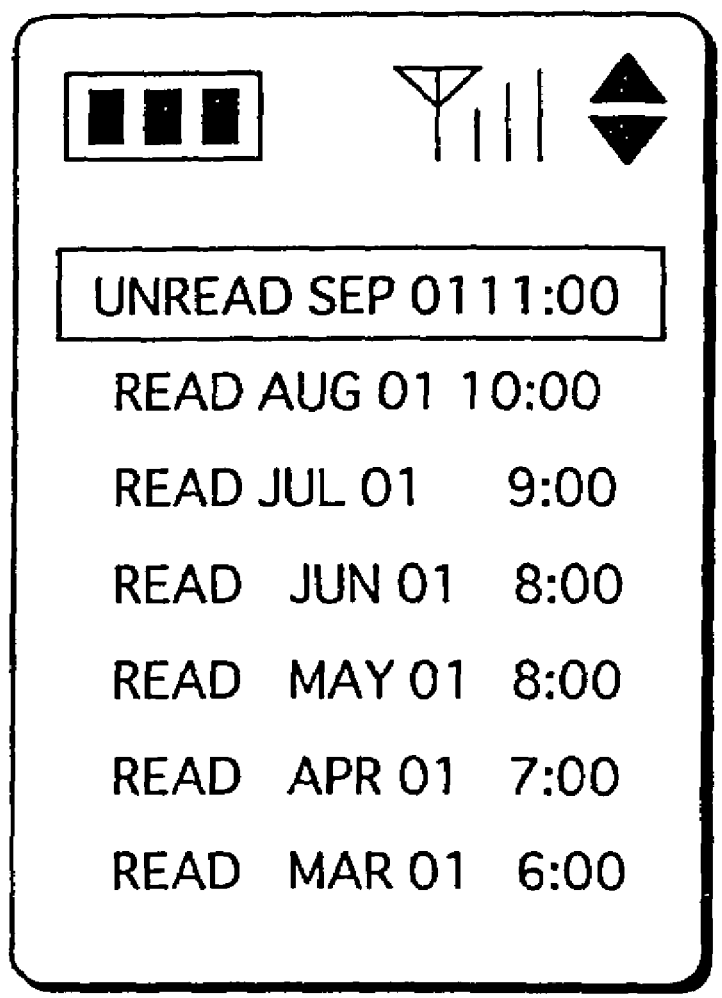
FIG. 14 is another screen display example of the sub-display and the main display.

FIG. 11 is a flowchart showing the overall operations of the folding communication terminal of the present invention.

FIG. 12 to FIG. 15 are screen display examples of the sub-display 18 and the main display 2.

2.4.1 Stand-by Processing

When having its power turned on or on detecting a new radio wave from a base station (not illustrated), the folding communication terminal 1 performs position registration with the base station by transmitting and receiving signals in a predetermined series of procedures according to the control of the control unit 20 (Step S201), and moves into stand-by. In stand-by the folding communication terminal 1 intermittently receives incoming-communication reception signals transmitted from the base station (Step S202). It is supposed here that the folding communication terminal 1 is in the closed state (in other words, the state shown in FIG. 1c) at this point.

FIG. 12(A) shows a display screen on the sub-display 18 when the folding communication terminal 1 is in the closed state in stand-by. The control unit 20 obtains the present time and the electric field strength from a clock circuit and an RSSI detection unit respectively (neither is illustrated), and displays stand-by information which includes the present time (9:30 in the example) and an antenna pictograph expressing the electric field strength (Step 203). In addition, although not showing in the drawing, the blank space to the left of the time may be used to display icons expressing the state of set up of the terminal and whether there in incoming-mail history information. Note that since clock circuits and RSSI detection units are components that are conventionally generally contained in communication terminals an explanation will be omitted.

2.4.2 Incoming-communication Processing and Simplified Information Display Processing When the folding communication terminal 1 is in a closed state and it receives an incoming-communication notification signal for a call, an e-mail or a character message (Step S204), the control unit 20 rings the ringer or operates the vibrator motor for a predetermined period, in accordance with the type of incoming-communication, to page the user (Step S205).

In the present embodiment it is assumed that the user is not able to respond to the incoming-communication straight away because for instance they are busy or not present. In other words, it is assumed that the user does not answer calls, and does not perform an operation to confirm incoming-communication history information for e-mail and character mail.

The control unit 20 generates incoming-communication history information which it writes to the incoming-communication history information memory (step S206), and displays on the sub-display 18 simplified information which includes the type and reception time of the most recently received incoming-communication notification signal (Step S207).

The following is a specific example of a case in which four incoming-communication notification signals are received.

(1) The folding communication terminal 1 receives an incoming-communication notification signal for a call at 10:00 on September 1, and the user does not answer the call. The control unit 20, after operating the ringer or the vibrator motor for a predetermined period, adds the incoming-communication history information in row 414 to the incoming-communication history information table 400, and displays simplified information about the incoming-communication on the sub-display 18.

The response category of the incoming-communication history information is made to show "missed", meaning that the user did not answer the call, and the display flag is set to "0", showing that the incoming-communication history information has not been displayed.

FIG. 12(B) shows a display example of the simplified information. This display shows that a call was received at 10:00, and that there is one piece of incoming-communication history information about a call (namely, the present call) that has not been displayed. This display is maintained in stand-by until there is new incoming-communication.

(2) The folding communication terminal 1 receives an incoming-communication notification signal showing that an e-mail was received by the mail server at 10:30 on September 1. The control unit 20, after generating a beeping sound, adds incoming-communication history information in row 415 to the incoming-communication history information table 400, and displays simplified information about the incoming-communication on the sub-display 18.

The response category of the incoming-communication history information is made to show "unread", meaning that the user has not read the e-mail, and the display flag is set to "0", showing that the incoming-communication history information has not been displayed.

FIG. 12(C) shows a display example of the simplified information. This display shows that e-mail was received by the mail server at 10:30, and that there is one piece of incoming-communication history information about e-mail (namely, the present e-mail) that has not been displayed. This display is maintained in stand-by until there is new incoming-communication.

(3) The folding communication terminal 1 receives an incoming-communication notification signal showing that a character mail was received by the mail server at 11:00 on September 1. The control unit 20, after generating a beeping voice, adds incoming-communication history information in row 416 to the incoming-communication history information table 400, and displays simplified information about the incoming-communication on the sub-display 18.

The response category of the incoming-communication history information is made to show "unread", meaning that the user has not read the character message, and the display flag is set to "0", showing that the incoming-communication history information has not been displayed.

FIG. 12(D) shows a display example of the simplified information. This display shows that a character message was received by the mail server at 11:00, and that there is one piece of incoming-communication history information about character messages (namely, the present character message) that has not been displayed. This display is maintained in stand-by until there is new incoming-communication.

(4) The folding communication terminal 1 receives an incoming-communication notification signal once more showing that an e-mail was received by the mail server at 11:30 on September 1. The control unit 20, after generating a beeping voice, adds incoming-communication history information in row 417 to the incoming-communication history information table 400, and displays simplified information about the incoming-communication on the sub-display 18.

The response category of the incoming-communication history information is made to show "unread", meaning that the user has not read the e-mail, and the display flag is set to "0", showing that the incoming-communication history information has not been displayed.

FIG. 12(E) shows a display example of the simplified information. This display shows that e-mail was received by the mail server at 11:30, and that there are two pieces of incoming-communication history information about e-mail that have not been displayed. This display is maintained in stand-by until there is new incoming-communication.

2.4.3 Illumination Color Selection Process

When the user operates the side OK key 12 or the side scroll key 13 while the folding communication terminal 1 is in stand-by or while simplified information is being displayed (Step S211), the control unit 20 invokes and executes the illumination color selection process (step S211).

Figure 16:
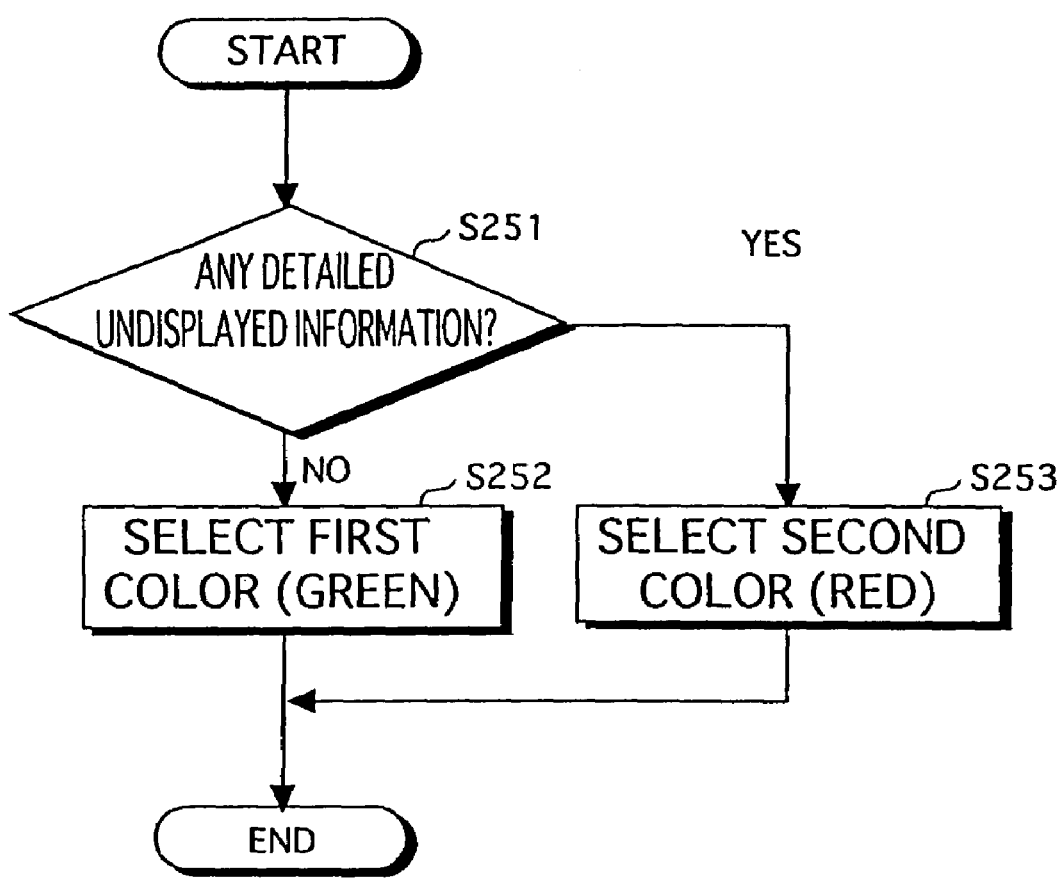
FIG. 16 is a flowchart showing the details of an illumination color selection process.

FIG. 16 is a flowchart showing the illumination color selection process in detail.

The control unit 20 searches the incoming-communication history information table 400 to judge whether there is any incoming-communication history information whose display flag is set to "0" (step S251). When there is no such information the control unit 20 selects the first color, green (step S252), and when there is such information the control unit 20 selects the second color, red (step S253).

Next, returning to the flowchart in FIG. 11, the control unit 20 has the sub-display 18 illuminated in the color which selected in the illumination color selected procedure (Step S213).

As an example, when the side OK key 12 or the side scroll key 13 is operated while the simplified information of FIG. 12(E) is being displayed the control unit 20 has the sub-display 18 illuminated in red because there is incoming-communication history information stored in the incoming-communication history information table 400 that has not been displayed. On the other hand, when there is no incoming-communication history information stored in the incoming-communication history information table 400 that has not been displayed and the stand-by information shown in FIG. 12(A) is being displayed, the control unit 20 lights the sub-display 18 in green if a key operation is performed.

2.4.4 Display Updating Process According to Open/Close Operations

If the user open the folding communication terminal 1 while it is in stand-by or is displaying simplified information, the control unit 20 detects according to the open/close detection switch 19 that the folding communication terminal 1 is in an open state (namely, the state in FIG. 1*a* or FIG. 1*b*) (Step S226), terminates the display on the sub-display 18 (step S221), and displays illuminated on the main display 2 incoming-communication history information corresponding to the simplified information that was being displayed on the sub-display 18 (Step S222).

The control unit 20 updates the value in the display flag column 406 of the incoming-communication history information table 400 for the incoming-communication history information that is being displayed on the main display 2 to "1".

If the user closes the folding communication terminal 1 while the incoming-communication history information is being displayed on the main display 1, the control unit 20 detects, according to the open/close detection switch 19, that the folding communication terminal 1 has been closed (namely, the state in FIG. 1*c*) (Step S231). Then, as well as turning off the main display 2 (Step S232), the control unit 20 searches the incoming-communication history information table 400 and, when there is incoming-communication history information whose display flag is set to "0", displays the simplified information of the newest piece of the information, and when there is no such information, displays the stand-by information on the sub-display 18 (Step S233).

The following is a specific example of when the incoming-communication history information shown in FIG. 10 is recorded in the incoming-communication history information table 400.

(1) After the incoming-communication notification signal for the last e-mail is received, the display shown in FIG. 12(E) is performed on the sub-display 18. When the user opens the folding communication apparatus 1 while the stated display is being performed, the control unit 20 recognizes according to the open/close detection switch 19 that the folding communication terminal 1 is open, and terminates the display on the sub-display 18.

FIG. 13 shows the subsequent display contents of the main display 2 and the sub-display 18.

Since the sub-display 18 was displaying simplified information about e-mail, on terminating the display on the sub-display 18 the control unit 20 displays incoming-communication history information about the unread e-mails on the main display 2 (See FIG. 13(A)). Furthermore, the control unit 20 updates the display flag column for the rows 417 and 415 in the incoming-communication history information table 400 to "1".

FIG. 13(A) shows that as unread e-mail there is an e-mail number 001 from Taro Yamada that arrived at 10:30 on September 1 and has a subject "About the other day", and an e-mail number 002 from jiro@aaa.bbb.co.jp that arrived at 11:30 on September 1 and has a subject "Meeting". Note that the e-mail number 001 is surrounded by a rectangular frame. This is to express that number 001 is highlighted, and shows that number 001 is selected. Furthermore, if the menu/OK key 6 is pressed in this state the folding communication terminal 1 connects wirelessly with the mail server to obtain the contents of the e-mail number 001, and displays the obtained contents on the main display 2. Other e-mail can be selected by operations of the 4-position key 104 up and down. Note that the icon at the top left of the display shows the amount of battery left.

If the user closes the folding communication terminal 1 while the display state is that in FIG. 13(A) or after having the content of the e-mail displayed, the control unit 20 recognizes according to an input of a signal from the open/close detection switch 19 that the folding communication terminal 1 has been closed. The control unit 20 turns off the main display 2 as well as displaying the newest incoming-communication history information amongst the incoming-communication history information in the table 400 whose display flag is "0". Here the control unit 20 displays that a c-mail, in other words a character message, was received at 11:00 (see FIG. 13(B)). Note that this display content is the same as that in FIG. 12(D).

If the user operates the side OK key 12 or the side scroll key 13 while the display state is that shown in FIG. 13(B) (an unilluminated state), the control unit 20 invokes the illumination color selection process again. Since the display flags in rows 414 and 416 are set to "0", the control unit 20 selects red, and has the sub-display 18 illuminated in red.

(2) Next, if the user opens the folding communication terminal 1 while the display state shown in (B) in FIG. 13, the control unit 20 recognizes, according to the open/close detection switch 19, that the folding communication terminal 1 is in an open state and terminates the display on the sub-display 18.

FIG. 13 shows the subsequent display state of the main display 2 and the sub-display 18.

Since simplified information about the character message was being displayed on the sub-display 18, the control unit 20 displays the detailed information about the character message on the main display 2 on terminating the display on the sub-display 18 (see FIG. 14(A)). Furthermore, the control unit 20 updates the display flag column 406 for the row 416 in the incoming-communication history information table 400 to "1".

FIG. 14(A) shows that an unread character message arrived on September 1 at 11:00, and that there are six other character messages. Note that the top, unread character message is surrounded by a rectangular frame. This is to express the character message is highlighted, and shows that the character message is selected. Furthermore, if the menu/OK key 6 is pressed in this state the folding communication terminal 1 connects wirelessly with the mail server to obtain the contents of the e-mail number 001, and displays the obtained contents on the main display 2.

If the user closes the folding communication terminal 1 after the state in FIG. 14(A), the control unit 20 recognizes according to the open/close detection switch 19 that the folding communication terminal 1 has been closed. The control unit 20 turns off the main display 2 as well as displaying the newest incoming-communication history information amongst the incoming-communication history information in the table 400 whose display flag is "0". Here the control unit 20 displays that a call was received at 10:00. Note that this display content is the same as that in FIG. 12(B).

If the user operates the side OK key 12 or the side scroll key 13 while the display state is that shown in FIG. 14(B) (an unilluminated state), the control unit 20 invokes the illumination color selection process again. Since the display flag in row 414 is set to "0", the control unit 20 selects red, and has the sub-display 18 illuminated in red.

(3) Next, if the user opens the folding communication terminal 1 while the display state is that in FIG. 14(B), the control unit 20 recognizes, according to the open/close detection switch 19, that the folding communication terminal 1 is in an open state and terminates the display on the sub-display 18.

FIG. 15 shows the subsequent display state of the main display 2 and the sub-display 18.

Since simplified information about the call was being displayed on the sub-display 18, on terminating the display on the sub-display 18, the control unit 20 displays the detailed information about the call on the main display 2 (see FIG. 15(A)). Furthermore, the control unit 20 updates the display flag column 406 for the row 414 in the incoming-communication history information table 400 to "1".

FIG. 15(A) shows at number 01 that a call which was not answered arrived on September 1 at 11:00 from a telephone number 09012345678, and that calls number 02, 03, and 04 were also received before the call number 01. "Answered" indicates calls that the user answered, and "missed" indicates calls that the user did not answer. Note that the top, unanswered call is surrounded by a rectangular frame. This is to express that the call is highlighted, and shows that the call is selected. Furthermore, if the start key 14 is pressed in this state a call to the displayed telephone number is initiated.

If the user closes the folding communication terminal 1 after the state in FIG. 15(A) the control unit 20 recognizes according to the open/close detection switch 19 that the folding communication terminal 1 is closed. The control unit 20 turns off the main display 2, and since there is no incoming-communication history information whose display flag is "0" in the incoming-communication history information table 400 the control unit returns to ordinary stand-by (see FIG. 15(B)). Note that this is the same display content as that in FIG. 12(A).

If the user operates the side OK key 12 or the side scroll key 13 while the display state is that shown in FIG. 15(B) (an unilluminated state), the control unit 20 invokes the illumination color selection process again. Since there is no incoming-communication history information whose display flag is set to "0", the control unit 20 selects green, and has the sub-display 18 illuminated in green.

2.5 Modifications of the Illumination Color Selection Process

Figure 17:
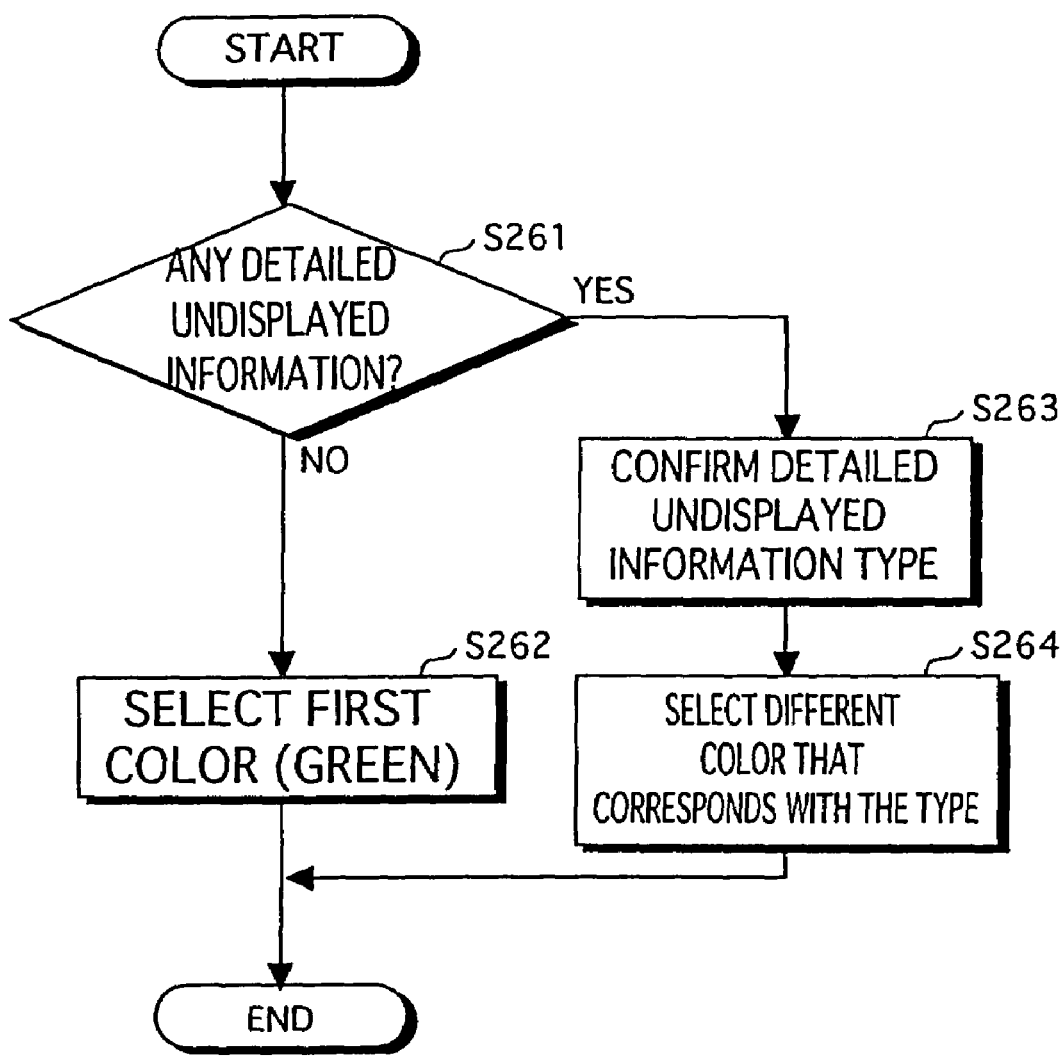
FIG. 17 is a flowchart showing the details of another illumination color selection process.

FIG. 17 shows another illumination color selection process in detail. This process is invoked at Step S212 in FIG. 11 instead of the illumination color selection process shown in FIG. 16.

The control unit 20 searches the incoming-communication history information table 400 and judges whether there is any incoming-communication history information whose display flag is set to "0" (step S261). When there is no such information the control unit 20 selects the first color, green (step S262). When there is such information the control unit 20 confirms the type of communication by referring to the communication category (Step S263), and selects a color that corresponds to the type and that is different to the first color (S264).

For example, the control unit 20 may select red, blue, and yellow in correspondence with calls, e-mail, and character messages respectively. Furthermore, when there is a plurality of pieces of incoming-communication history information that have not been displayed, the control unit 20 may select the color based on the piece of incoming-communication history information that has the newest reception date/time.

With this illumination color selection process, when FIG. 12(A), FIG. 12(B), FIG. 12(C), FIG. 12(D), and FIG. 12(E) are displayed on the sub-display 18, and the user operates the side OK key 12 or the scroll key 13, the sub-display 18 is illuminated in green, red, blue, yellow, and blue for each screen respectively.

FIG. 18 is a flowchart showing yet another illumination color selection process in detail. This process is invoked at Step S212 in FIG. 11 instead of the illumination color selection processes shown in FIG. 16 and FIG. 17.

In this illumination color selection process, the control unit 20 searches the incoming-communication history information table 400 and judges whether there is any incoming-communication history information whose display flag is "0" (Step S271). When the control unit 20 judges that there is no such information it chooses the first color, green (Step S272). When the control unit judges that there is such information it refers to the communication type category in the incoming-communication history information to count the number of types of incoming-communication (Step S273), and chooses a color which is different to the first color and which corresponds to the number of types (Step S274).

For example, the control unit 20 may select red, blue, and yellow when there is one, two, and three types respectively of incoming-communication history information which have not been displayed.

With this illumination color selection process, when FIG. 12(A), FIG. 12(B), FIG. 12(C), FIG. 12(D), and FIG. 12(E) are displayed on the sub-display 18, and the user operates the side OK key 12 or the scroll key 13, the sub-display 18 is illuminated in green, red, blue, yellow, and yellow for each screen respectively.

2.6 Conclusion

As explained, according to the folding communication terminal and the illumination color selection method of the present invention, when the folding communication terminal is in a closed state and a sub-display illumination operation is performed, the first color (for example, green) is selected to illuminate the sub-display when the display content is the stand-by screen. However, when there is incoming-communication history information which has not been displayed, a color which is different to the first color is selected to illuminate the sub-display according to the type of communication of the number of types of communication. Therefore the user can confirm instantly with just a glance at the color whether there is incoming-communication history information, and the type or number of types of the incoming-communication history information.

<Other Modifications>

Note that the present invention has been explained based on the above-described embodiments, but is of course not limited to the above-described embodiments. Cases such as the following are also included in the present invention.

The present invention may be a method which includes the steps described in the embodiments. Furthermore, the present invention may be a computer program for realizing the method of a computer system, and the present invention may be a digital signal expressing the computer program.

Furthermore, the present invention may be a computer-readable recording medium on which the computer program or the digital signal is recorded, for example a flexible disk, a hard disk, a CD-ROM (Compact Disk Read Only Memory), an MO (magneto-optical), a DVD (Digital Versatile Disk), a DVD-ROM (Digital Versatile Disk Read Only Memory), a DVD-RAM (Digital Versatile Disk Random Access Memory), a semi-conductor memory, or the like.

Furthermore, the present invention may be the computer program or the digital signal transmitted via a network for instance, of which an electric communication line, a wireless or wired communication line, and the Internet are representative.

Furthermore, the present invention may be the stated method realized by a computer system which has a microprocessor and a memory, which stores the program in the memory, and in which the microprocessor operates according to the program stored in the memory.

Furthermore, the program or the digital signal may be conveyed via the network for instance or by being recorded on a recording medium, and executed in an independent computer system.

What is claimed is:

1. A foldable communication terminal which receives caller information during reception of an incoming call, and has a detection function for detecting whether a main body of the communication terminal is in a folded state or in an unfolded state, comprising:

operation reception means for receiving an operation from a user when the main body is in the unfolded state;

a main display device which is visible to a user only when the main body is in the unfolded state, and which is capable of multicolor illumination display;

a sub-display device which is visible to the user when the main body is in the folded state, and which is capable of multicolor illumination display;

display control means for, when the incoming call is received while the main body is in the folded state, (a) having the sub-display device illuminated in a first color when the caller information does not show a caller telephone number, and (b) having the sub-display device illuminated in a second color, which is different to the first color, when the caller information shows the caller telephone number, having the main display device illuminated in the second color when the detection function subsequently detects that the main body is in the unfolded state, and having the caller telephone number shown by the caller information displayed on the main display device; and communication control means for, when the incoming-call is received while the main body is in the unfolded state and the main display device is being illuminated in the second color, upon the operation reception means receiving the operation from the user, performing processing to establish voice communication with a caller of the incoming-communication.

2. The communication terminal of claim 1,
wherein, when the detection function detects that the main body is in the unfolded state, the display control means stops the sub-display device being illuminated.

3. A foldable communication terminal which receives caller information during reception of an incoming call, and has a detection function for detecting whether a main body of the communication terminal is in a folded state or in an unfolded state, comprising:
   operation reception means for receiving an operation from a user when the main body is in the unfolded state;
   a telephone directory memory for storing at least one telephone number;
   a main display device which is visible to a user only when the main body is in the unfolded state, and which is capable of multicolor illumination display;
   a sub-display device which is visible to the user when the main body is in the folded state, and which is capable of multicolor illumination display;
   registration judgement means for judging, when the incoming call is received while the main body is in the folded state and if the caller information shows a caller telephone number, whether a same telephone number as the caller telephone number is stored in the telephone directory memory;
   display control means for
   (a) having the sub-display device illuminated in a first color, when the registration judgement means judges that the same telephone number is not stored in the telephone directory memory, and
   (b) having the sub-display device illuminated in a second color, which is different to the first color, when the judgement means judges that the same telephone number is stored in the telephone directory memory, having the main display device illuminated in the second color when the detection function detects subsequently detects that the main body is in the unfolded state, and having the caller telephone number shown by the caller information displayed on the main display device; and
   communication control means for, when the incoming-call is received while the main body is in the unfolded state and the main display device is being illuminated in the second color, upon the operation reception means receiving the operation from the user, performing processing to establish voice communication with a caller of the incoming-communication.

4. The communication terminal of claim 3,
wherein, when the detection function detects that the main body is in the unfolded state, the display control means stops the sub-display device being illuminated.

5. A communication terminal which receives caller information when receiving an incoming call, and has a detection function which detects whether a main body of the communication terminal is in a folded state or an unfolded state, comprising:
   operation reception means for receiving an operation from a user when the main body is in the unfolded state;
   a telephone directory memory for storing at least one telephone number in correspondence with color specification information;
   a main display device which is visible to a user only when the main body is in the unfolded state, and which is capable of multicolor illumination display;
   a sub-display device which is visible to the user when the main body is in the folded state, and which is capable of multicolor illumination display;
   registration judgement means for judging, when the incoming call is received while the main body is in the folded state and if the caller information shows a caller telephone number, whether a same telephone number as the caller telephone number is stored in the telephone directory memory;
   display control means for
   (a) having the sub-display device illuminated in a first color, when the registration judgement means judges that the same telephone number is not stored in the telephone directory memory, and
   (b) having the sub-display device illuminated, when the registration judgement means judges that the same telephone number is stored in the telephone directory memory, in a color specified by the color specification information that is stored in correspondence with the same telephone number, having the main display device illuminated in the second color when the detection function subsequently detects that the main body is in the unfolded state, and having the caller telephone number shown by the caller information displayed on the main display device; and
   communication control means for, when the incoming-call is received while the main body is in the unfolded state and the main display device is being illuminated in the second color, upon the operation reception means receiving the operation from the user, performing processing to establish voice communication with a caller of the incoming-communication.

6. The communication terminal of claim 5
wherein, when the detection function detects that the main body is in the unfolded state, the display control means stops the sub-display device being illuminated.

7. A display control method for use with a communication terminal, the communication terminal (a) receiving caller information when receiving an incoming call, (b) being foldable, (c) being composed of (i) operation reception means for receiving an operation from a user when a main body of the communication terminal is in an unfolded state, (ii) a main display device which is visible to a user only when the main body of the communication terminal is in the unfolded state and which is capable of multicolor illumination display, and (iii) a sub-display device which is visible to the user when the main body is in a folded state and which is capable of multicolor illumination display, and (d) having a detection function for detecting whether the main body is in the folded state or in the unfolded state, the display control method comprising:
   a first illumination step for having the sub-display device illuminated in a first color when the caller information does not show a caller telephone number;
   a second illumination step for having the sub-display device illuminated in a second color, which is different to the first color, when the caller information shows the caller telephone number, having the main display device illuminated in the second color when the detection function subsequently detects that the main body is in the unfolded state, and having the caller telephone number shown by the caller information displayed on the main display device; and a communication control step for, when the incoming-call is received while the main body is in the unfolded state and the main display device is being illuminated in the second color, upon the operation reception means receiving the operation from the user, performing processing to establish voice communication with a caller of the incoming-communication.

8. The display control method of claim 7, further comprising:
a tuning-off step for stopping, when the detection function detects that the main body is in the unfolded state, the sub-display device being illuminated.

9. A display control method for use with a communication terminal, the communication terminal (a) receiving caller information when receiving an incoming call, (b) being foldable, (c) being composed of (i) operation reception means for receiving an operation from a user when a main body of the communication terminal is in an unfolded state, (ii) a telephone directory memory for storing at least one telephone number, (iii) a main display device which is visible to a user only when the main body of the communication terminal is in the unfolded state and which is capable of multicolor illumination display, and (iv) a sub-display device which is visible to the user when the main body is in a folded state and which is capable of multicolor illumination display, and (d) having a detection function for detecting whether the main body is in the folded state or in the unfolded state, the display control method comprising:
a registration judgement step for judging, when the incoming call is received while the main body is in the folded state and if the caller information shows a caller telephone number, whether a same telephone number as the caller telephone number is stored in the telephone directory memory;
a first illumination step for having the sub-display device illuminated in a first color, when the registration judgement step judges that the same telephone number is not stored in the telephone directory memory;
a second illumination step for having the sub-display device illuminated in a second color, which is different to the first color, when the registration judgement step judges that the same telephone number is stored in the telephone directory memory, having the main display device illuminated in the second color when the detection function subsequently detects that the main body is in the unfolded state, and having the caller telephone number shown by the caller information displayed on the main display device; and
a communication control step for, when the incoming-call is received while the main body is in the unfolded state and the main display device is being illuminated in the second color, upon the operation reception means receiving the operation from the user, performing processing to establish voice communication with a caller of the incoming-communication.

10. The display control method of claim 9
a turning-off step for stopping, when the detection function detects that the main body is in the unfolded state, the sub-display device being illuminated.

11. A display control method for use with a communication terminal, the communication terminal (a) receiving caller information when receiving an incoming call, (b) being foldable, (c) being composed of (i) operation reception means for receiving an operation from a user when a main body of the communication terminal is in an unfolded state, (ii) a telephone directory memory for storing at least one telephone number in correspondence with color specification information, (iii) a main display device which is visible to a user only when the main body of the communication terminal is in the unfolded state and which is capable of multicolor illumination display, and (iv) a sub-display device which is visible to the user when the main body is in a folded state and which is capable of multicolor illumination display, and (d) having a detection function for detecting whether the main body is in the folded state or in the unfolded state, the display control method comprising:
a registration judgement step for judging, when the incoming call is received while the main body is in the folded state and if the caller information shows a caller telephone number, whether a same telephone number as the caller telephone number is stored in the telephone directory memory;
a first illumination step for having the sub-display device illuminated in a first color, when the registration judgement step judges that the same telephone number is not stored in the telephone directory memory;
a second illumination step for having the sub-display device illuminated, when the registration judgement step judges that the same telephone number is stored in the telephone directory memory, in a color specified by the color specification information that is stored in correspondence with the same telephone number, having the main display device illuminated in the second color when the detection function subsequently detects that the main body is in the unfolded state, and having the caller telephone number shown by the caller information displayed on the main display device; and
a communication control step for, when the incoming-call is received while the main body is in the unfolded state and the main display device is being illuminated in the second color, upon the operation reception means receiving the operation from the user, performing processing to establish voice communication with a caller of the incoming-communication.

12. The display control of claim 11, further comprising:
a turning-off step for stopping, when the detection function detects that the main body is in the unfolded state, the sub-display device being illuminated.

* * * * *